(12) United States Patent
Balasubramanian et al.

(10) Patent No.: US 10,516,605 B2
(45) Date of Patent: Dec. 24, 2019

(54) ENHANCING PERFORMANCE OF MULTI-PATH COMMUNICATIONS

(71) Applicant: Vid Scale, Inc., Wilmington, DE (US)

(72) Inventors: Anantharaman Balasubramanian, San Diego, CA (US); Liangping Ma, San Diego, CA (US); Dirk Trossen, London (GB)

(73) Assignee: VID SCALE, INC., Wilmington, DE (US)

(*) Notice: Subject to any disclaimer, the term of this patent is extended or adjusted under 35 U.S.C. 154(b) by 0 days.

(21) Appl. No.: 15/579,159

(22) PCT Filed: Jun. 3, 2016

(86) PCT No.: PCT/US2016/035839
§ 371 (c)(1),
(2) Date: Dec. 1, 2017

(87) PCT Pub. No.: WO2016/197004
PCT Pub. Date: Dec. 8, 2016

(65) Prior Publication Data
US 2018/0309664 A1    Oct. 25, 2018

Related U.S. Application Data

(60) Provisional application No. 62/170,634, filed on Jun. 3, 2015.

(51) Int. Cl.
*H04L 12/66* (2006.01)
*H04L 12/721* (2013.01)
(Continued)

(52) U.S. Cl.
CPC .............. *H04L 45/38* (2013.01); *H04L 45/24* (2013.01); *H04L 45/42* (2013.01); *H04L 45/54* (2013.01);
(Continued)

(58) Field of Classification Search
CPC ......... H04L 45/24; H04L 45/42; H04L 45/54; H04L 45/74; H04L 47/11; H04W 40/02; H04W 84/12
See application file for complete search history.

(56) References Cited

U.S. PATENT DOCUMENTS

2012/0026877 A1*  2/2012  Rajappan .............. H04L 47/724
                                                           370/235
2013/0250779 A1*  9/2013  Meloche .............. H04L 41/5067
                                                           370/248
(Continued)

OTHER PUBLICATIONS

Apostolopoulos, John G., "Reliable Video Communication over Lossy Packet Networks using Multiple State Encoding and Path Diversity", Visual Communications and Image Processing (VCIP), vol. 4310, Jan. 24-26, 2001, 19 pages.

(Continued)

*Primary Examiner* — Chi Ho A Lee
(74) *Attorney, Agent, or Firm* — Condo Roccia Koptiw LLP

(57) ABSTRACT

Systems, methods, and instrumentalities are disclosed for enhancing performance of multi-path communications. Multi-path communication performance may be enhanced by determining whether multi-path communications share a congested router. A multi-path real-time communication protocol may provide techniques to prevent, detect, communicate and respond to a shared congested router. A shared congested router may be prevented, and/or detected using one or more detection techniques.

31 Claims, 17 Drawing Sheets

(51) Int. Cl.

| | |
|---|---|
| *H04L 12/741* | (2013.01) |
| *H04L 12/707* | (2013.01) |
| *H04L 12/717* | (2013.01) |
| *H04L 12/803* | (2013.01) |
| *H04L 12/891* | (2013.01) |
| *H04L 12/863* | (2013.01) |
| *H04L 12/801* | (2013.01) |
| *H04W 40/02* | (2009.01) |

(52) U.S. Cl.
CPC ............ *H04L 45/566* (2013.01); *H04L 45/74* (2013.01); *H04L 47/11* (2013.01); *H04L 47/122* (2013.01); *H04L 47/41* (2013.01); *H04L 47/6255* (2013.01); *H04W 40/02* (2013.01); *H04L 12/66* (2013.01)

(56) References Cited

U.S. PATENT DOCUMENTS

| | | | | |
|---|---|---|---|---|
| 2015/0055623 | A1* | 2/2015 | Li | H04W 40/04 370/331 |
| 2015/0078377 | A1* | 3/2015 | Wijnands | H04L 12/1886 370/390 |
| 2015/0124622 | A1* | 5/2015 | Kovvali | H04W 28/0215 370/236 |
| 2015/0365325 | A1* | 12/2015 | Hwang | H04L 47/70 370/230 |
| 2016/0094465 | A1* | 3/2016 | Park | H04L 43/0864 370/235 |
| 2016/0100332 | A1* | 4/2016 | Yi | H04L 67/26 370/338 |
| 2016/0119159 | A1* | 4/2016 | Zhao | H04L 12/1854 370/390 |
| 2016/0135074 | A1* | 5/2016 | Welin | H04L 63/0272 370/235 |
| 2016/0294682 | A1* | 10/2016 | Bi | H04W 76/10 |
| 2017/0104671 | A1* | 4/2017 | Zhang | H04L 12/4633 |
| 2017/0237654 | A1* | 8/2017 | Turner | H04L 41/0668 370/218 |

OTHER PUBLICATIONS

Coudron et al., "Boosting Cloud Communications through a Crosslayer Multipath Protocol Architecture", IEEE SDN for Future Networks and Services, Nov. 11-13, 2014, 8 pages.
Ford et al., "TCP Extensions for Multipath Operation with Multiple Addresses", draft-ford-mptcp-multiaddressed-03, Mar. 8, 2010, 36 pages.
Hayes et al., "Progress on Practical Shared Bottleneck Detection for Coupled Congestion Control", IETF MPTCP Proceedings, Mar. 2014, 21 pages.
Hayes et al., "Shared Bottleneck Detection for Coupled Congestion Control for RTP Media", draft-hayes-rmcat-sbd-00, RTP Media Congestion Avoidance Techniques, Oct. 10, 2014, 12 pages.
Higginbotham, Stacey, "Google Launches Andromeda, a Software Defined Network Underlying its Cloud", Available at https://gigaom.com/2014/04/02/google-launches-andromeda-a-software-defines-network-underlying-its-cloud/, Apr. 2, 2014, 5 pages.
Katabi et al., "A Passive Approach for Detecting Shared Bottlenecks", IEEE, Proceedings Tenth International Conference on Computer Communications and Networks, Feb. 2001, 10 pages.
Kay, Steven M., "Fundamentals of Statistical Signal Processing", vol. II: Detection Theory, Signal Processing, Upper Saddle River, NJ: Prentice Hall, Jan. 27, 1998, 672 pages.
Kerner, Michael Sean, "Cisco Opens Up Networking Fabric for SDN", Available at http://www.enterprisenetworkingplanet.com/datacenter/cisco-opens-up-networking-fabric-for-sdn.html, Feb. 4, 2013, 2 pages.
Li, A., "RTP Payload Format for Generic Forward Error Correction", Network Working Group, Request for Comments: 5109, Dec. 2007, 44 pages.
McKeown et al., "OpenFlow: Enabling Innovation in Campus Networks", ACM SIGCOMM Computer Communication Review, vol. 38, No. 2, Apr. 2008, pp. 69-74.
Newman, Mark, "Networks: An Introduction", Oxford University Press, May 2010, 1042 pages.
Nichols et al., "Controlling Queue Delay", Communication of the ACM, vol. 55, No. 7, Jul. 2012, 9 pages.
Peerkins et al., "Web Real-Time Communication (WebRTC): Media Transport and Use of RTP", draft-ietf-rtcweb-rtp-usage-22, RTCWEB Working Group, Feb. 9, 2015, 45 pages.
Peterson et al., "Computer Networks: A Systems Approach", The Morgan Kauffman Series in Networking, Fifth Edition, Mar. 11, 2011, 917 pages.
Rubenstein et al., "Detecting Shared Congestion of Flows via End-to-End Measurement", IEEE/ACM Transactions on Networking, vol. 10, No. 3, Jun. 2002, pp. 381-395.
Sandri et al., "On the Benefits of Using Multipath TCP and Openflow in Shared Bottlenecks", IEEE 29th International Conference on Advanced Information Networking and Applications (AINA), Mar. 24-27, 2015, pp. 9-16.
Schulzrinne et al., "RTP: A Transport Protocol for Real-Time Applications", Network Working Group, Request for Comments: 3550, Jul. 2003, 89 pages.
Singh et al., "MPRTP: Multipath Considerations for Real-time Media", Proceedings of the 4th ACM Multimedia Systems Conference, Oslo, Norway, Feb. 28-Mar. 1, 2013, 12 pages.
Singh et al., "Multipath RTP (MPRTP)", draft-ietf-avtcore-mprtp-00, AVT Core Working Group, Dec. 20, 2014, 40 pages.
Singh et al., "Multipath RTP (MPRTP)", draft-singh-avtcore-mprtp-08, AVT Core Working Group, Jan. 13, 2014, 36 pages.
Welzl, Michael, "Potential Applications of Shared Bottleneck Detection (SBD)", NNUW-1, University of Oslo, Simula, Oslo, Sep. 18, 2013, 23 pages.
Wijnands et al., "Encapsulation for Bit Index Explicit Replication in MPLS Networks", draft-wijnands-mpls-bier-encapsulation-01, Oct. 16, 2014, 11 pages.
Wijnands et al., "Encapsulation for Bit Index Explicit Replication in MPLS Networks", draft-ietf-bier-mpls-encapsulation-04, Internet Engineering Task Force, Apr. 18, 2016, 15 pages.
Wischik et al., "Design, Implementation and Evaluation of Congestion Control for Multipath TCP", Proceedings of the 8th USENIX Conference on Networked Systems Design and Implementation, Mar. 30-Apr. 1, 2011, 14 pages.
Zarifzadeh et al., "Range Tomography: Combining the Practicality of Boolean Tomography with the Resolution of Analog Tomography", Proceedings of the 2012 Internet Measurement Conference, Nov. 14-16, 2012, 13 pages.

* cited by examiner

```
                                Replace for MBIER
                                    Header 0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |0 1 0 1|  Ver  |  Len  |              Entropy                  |
   +-+-+-+-+-+-+-+-+-+-+-+-+-+-+-+-+-+-+-+-+-+-+-+-+-+-+-+-+-+-+-+-+
   |                   BitString (first 32 bits)                   ~
   +-+-+-+-+-+-+-+-+-+-+-+-+-+-+-+-+-+-+-+-+-+-+-+-+-+-+-+-+-+-+-+-+
   ~                                                               ~
   +-+-+-+-+-+-+-+-+-+-+-+-+-+-+-+-+-+-+-+-+-+-+-+-+-+-+-+-+-+-+-+-+
   ~                   BitString (last 32 bits)                    |
   +-+-+-+-+-+-+-+-+-+-+-+-+-+-+-+-+-+-+-+-+-+-+-+-+-+-+-+-+-+-+-+-+
   |OAM|   Reserved    |  Proto |            BFIR-id               |
   +-+-+-+-+-+-+-+-+-+-+-+-+-+-+-+-+-+-+-+-+-+-+-+-+-+-+-+-+-+-+-+-+
```

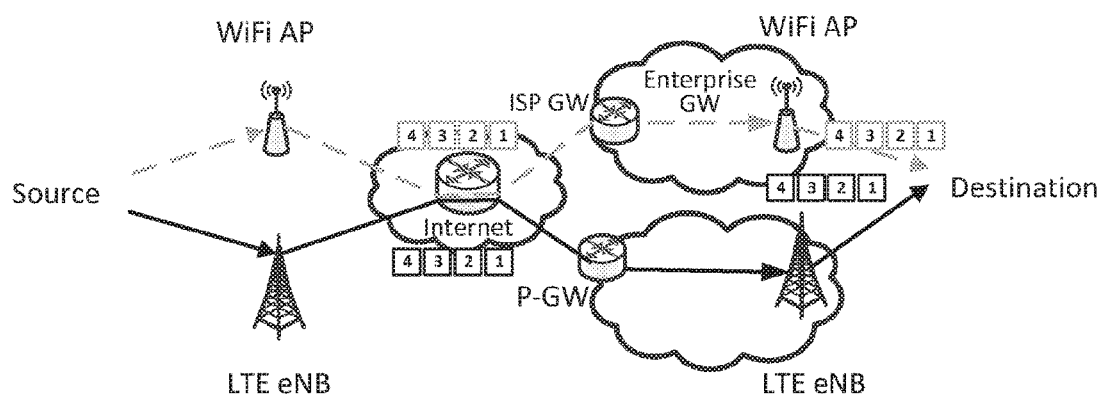
FIG. 14
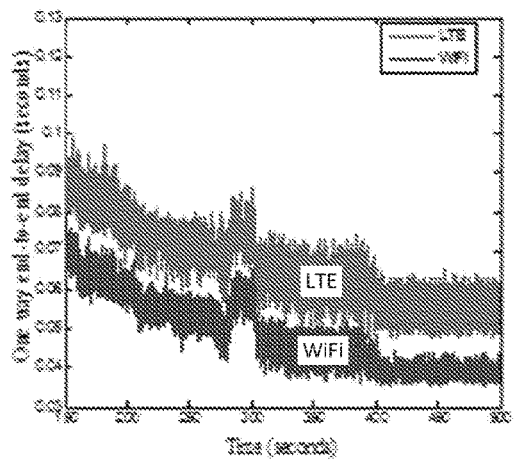 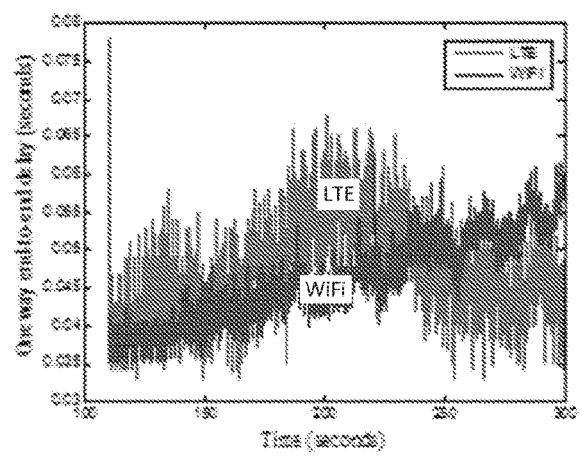
FIG. 15A    FIG. 15B

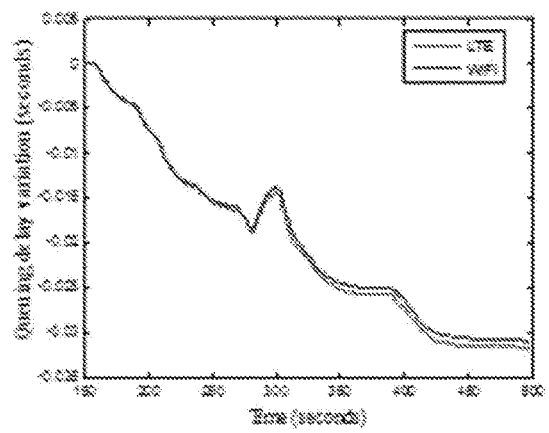
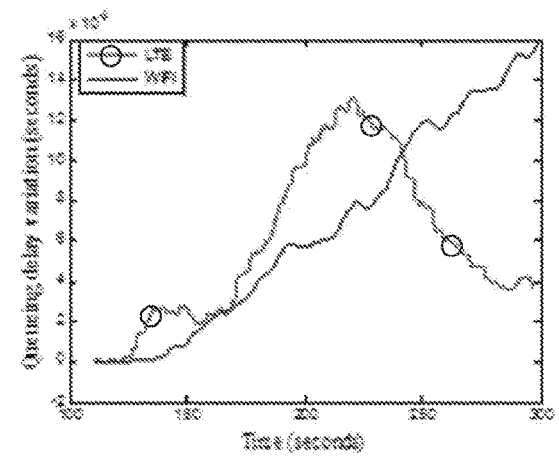
FIG. 16A  FIG. 16B
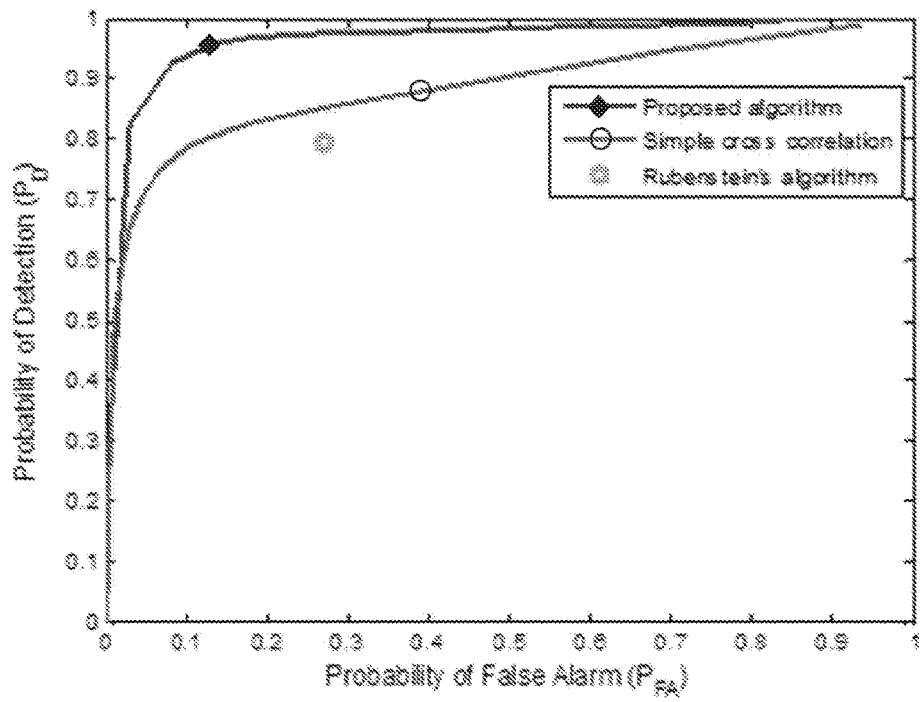
FIG. 19

ENHANCING PERFORMANCE OF MULTI-PATH COMMUNICATIONS

CROSS-REFERENCE TO RELATED APPLICATIONS

This application is a National Stage Entry under 35 U.S.C. § 371 of Patent Cooperation Treaty Application No. PCT/US2016/035839, filed Jun. 3, 2016, which claims the benefit of U.S. Provisional Patent Application No. 62/170,634, filed Jun. 3, 2015, the contents of which is are hereby incorporated by reference herein.

BACKGROUND

Multi-path mobile communication employs multiple wireless interfaces and separate sub-flows to theoretically increase throughput. However, multipath protocol (e.g., MPTCP) uses coupled congestion control, which assumes that sub-flows share a common congested router (for example, even in instances where there is not a shared congested router). Accordingly, the total sending rate of MPTCP is constrained by coupled congestion control for all sub-flows, even for sub-flows where constraint is not necessary, in which cases MPTCP fails to capitalize on available infrastructure to deliver higher throughput.

SUMMARY

Systems, methods, and instrumentalities are disclosed for a multi-path mobile communication flow, comprising receiving Internet Protocol (IP) flow association information, wherein the IP flow association information indicates a first sub-flow associated with a first Radio Access Technology (RAT) of the multi-path mobile communication flow, and a second sub-flow associated with a second RAT of the multi-path mobile communication flow, determining if the first sub-flow and the second sub-flow share a router, modifying a routing table for the multi-path mobile communication flow so that the first sub-flow uses a different router, and sending the at least one modified routing table to at least one router upstream from the routers.

Systems, methods, and instrumentalities are disclosed for a multi-path mobile communication flow, comprising receiving Internet Protocol (IP) flow association information, wherein the IP flow association information indicates a first sub-flow associated with a first Radio Access Technology (RAT) of the multi-path mobile communication flow, and a second sub-flow associated with a second RAT of the multi-path mobile communication flow, determining if the first sub-flow and the second sub-flow share a router, and causing an information hit to be set in a reverse flow associated with the multi-path mobile communication flow, or sending information to a sender of the first sub-flow and the second sub-flow about the shared router.

Systems, methods, and instrumentalities are disclosed for detecting a shared congested router in a multi-path mobile communication flow, comprising detecting a queuing delay for a first sub-flow associated with a first Radio Access Technology (RAT) of the multi-path mobile communication flow, detecting a queuing delay for a second sub-flow associated with a second RAT of the multi-path mobile communication flow, determining a queuing delay variation between the first sub-flow and the second sub-flow, and using the queuing delay variation, inferring the presence or absence of a shared congested router in a multi-path mobile communication flow.

Systems, methods, and instrumentalities are disclosed for receiving a packet belonging to a sub-flow of a multi-path protocol, determining a routing path for the packet based on a sub-flow id of the multi-path protocol, encapsulating the packet in a header with a field value corresponding to the routers of the routing path, and sending the encapsulated packet to the next router of the routing path. The header may be an MBIER header. The field may be a BitString field.

BRIEF DESCRIPTION OF THE DRAWINGS

FIG. 14 is a diagram of an example of out of order and assymetric handling of packets.

FIGS. 15A and 15B are examples of a one way end-to-end delay of packets received through LTE and WiFi paths for shared and non-shared cases, respectively.

FIGS. 16A and 16B are examples of queuing delay variation for shared and non-shared scenarios, respectively.

FIG. 19 is a plot of an example of receiver operating characteristic for shared and non-shared congested router detection.

DETAILED DESCRIPTION

Figure 1:
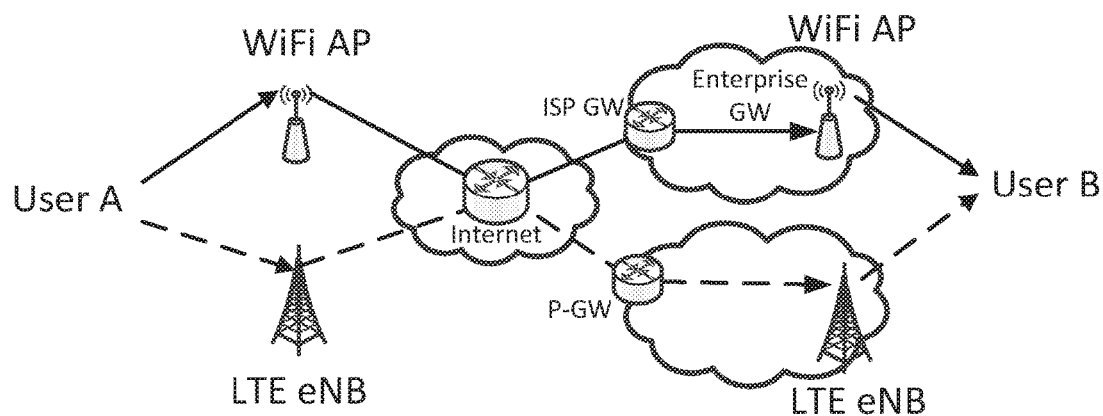
FIG. 1 is a diagram of an example scenario of LTE and WiFi paths having a shared router.

A detailed description of illustrative embodiments will now be described with reference to the various figures. Although this description provides a detailed example of possible implementations, it should be noted that the details are intended to be examples and in no way limit the scope of the application.

Multi-path communication mobile communication) performance may be enhanced by knowing whether multipath communications share a congested router. A multi-path real-time communication protocol may provide techniques to detect, communicate and respond to a shared congested router.

A shared congested router may be detected using one or more detection techniques. In an example of a software defined network (SDN) technique, flow association of a multi-path protocol may be signaled, for example, to a SDN controller. A SDN controller may utilize flow association information, for example, to detect and/or prevent a shared congested router.

A Multipath Bit Index Explicit Replication (MBIER)-based multi-path flow routing using peering points may be provided. Multi-path flow routing may be effected so as to avoid a shared congested router for example, without using SDN controller). A header may be provided, for example, so that the routers know how to handle the packet with the header. An ingress router may know the routes that correspond to disjoint paths. The ingress router may receive an incoming packet belonging to a sub-flow of a multi-path protocol. Based on a sub-flow id of the multi-path protocol, the ingress router may determine the route that the packet should take. The ingress router may encapsulate the received packet in the MBIER header with a "BitString" field value corresponding to the routers through which the packet may need to traverse. The "BitString" field may be provided such that each bit represents one router in the network. The encapsulated packet in the MBIER header may be transmitted. The encapsulated packet may reach one or more intermediate routers in the network. An intermediate router may reset (for example, disable) the bit (e.g., in the 'BitString' field) that corresponds to itself in the MBIER header. Forwarding through intermediate routers may continue until the packet reaches the egress router. The egress router upon receiving the packet may remove the MBIER header and forward the packet to a peering router in another network. Flow association information may be exchanged between peering points. A peering router may be aware of flow association information obtained from an ingress router.

In an example of an end to end technique, a receiver of a communication may observe an end-to-end delay of packets experienced by sub-flows of a multipath protocol. A receiver may detect the presence or absence of a shared congested router, for example, based on one or more algorithms. A result of the detection may be provided in (e.g., piggybacked on) an RTCP report, or options field of an IP packet/TCP header. A sender of a communication may receive and respond with appropriate action to information in an RTCP report or the information in the options field of an IP packet/TCP header. One or more techniques may permit one or more algorithms to be realized in multi-path TCP and RIP protocols.

WebRTC, a single path real time protocol, may be modified for compatibility with and improved efficiency in multi-path operation, for example, with respect to congestion control, scheduling efficiency and/or architectural enhancements during interface changes.

Virtual multi-path protocols may be realized using one or more architectures.

Improvements to multi-path communication performance may be compatible with, for example, multiple layers, e.g., L1, L2 and multiple system elements, e.g., network, UE.

SDN may provide flexibility in managing a control/data plane, e.g., according to application requirements. SDN may be used to manage infrastructure. SDN may be openflow-compatible.

Multi-path TCP (MPTCP) protocol may use coupled congestion control. Coupled congestion control may assume that multi-path flows share a congested router irrespective whether it is true or not. The assumption of a shared congested router may lead to constraints on a sender's sending rate. A sending rate constraint may be the maximum of the rates of all sub flows. While the assumption may take advantage of the path diversity offered by multiple paths, the assumption of a shared congested router may fail to reap the full benefits of obtaining higher throughputs.

Providing a sender with accurate information about the presence or absence of a shared congested router may enhance throughput offered by a multi-path protocol while maintaining system fairness. Improvements based on knowing whether a shared congested router exists may be applicable for any multi-path protocol, such as a multi-path real time protocol (MPRTP), MPTCP and multi-path WebRTC.

Network functions, such as applications, may be virtualized, e.g., network function virtualization (NFV), ETSI NFV, OPNFV. Multi-path protocols may be virtualized, e.g., virtualized multi-path protocol such as virtualized MPTCP.

A variety of techniques may detect a shared congested router. Examples are provided using a SDN approach and an end-to-end approach.

WebRTC, a single path real time protocol, may be modified for compatibility and improved efficiency with multi-path operation. Modifications may be made, for example, with respect to congestion control, scheduling efficiency and/or architectural enhancements during interface changes.

A source and destination may be endowed with multiple wireless interfaces, e.g., LTE, WiFi. Wireless access delays and wired link delays may vary as packets traverse from a source to a destination. A determination may be made about the presence or absence of shared congested router.

Figure 2:
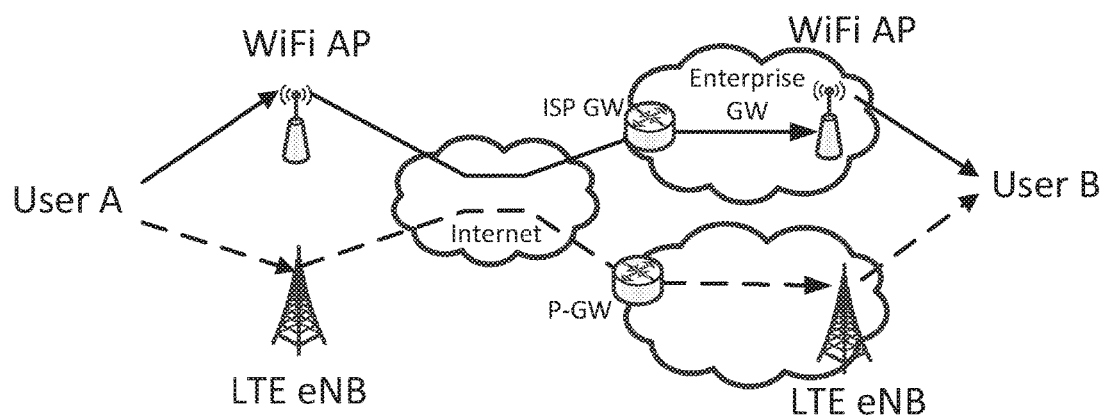
FIG. 2 is a diagram of an example scenario of LTE and WiFi paths that do not have a shared router.

FIG. 1 is a diagram of an example scenario of LTE and WiFi paths having a shared router. FIG. 2 is a diagram of an example scenario of LTE and WiFi paths that do not have a shared router.

Detection of shared and non-shared scenarios may be used, for example, to exercise appropriate congestion control at a source. As an example, a sender may use knowledge of a shared router to enhance throughput offered by a multi-path protocol while maintaining fairness to competing traffic.

Figure 3:
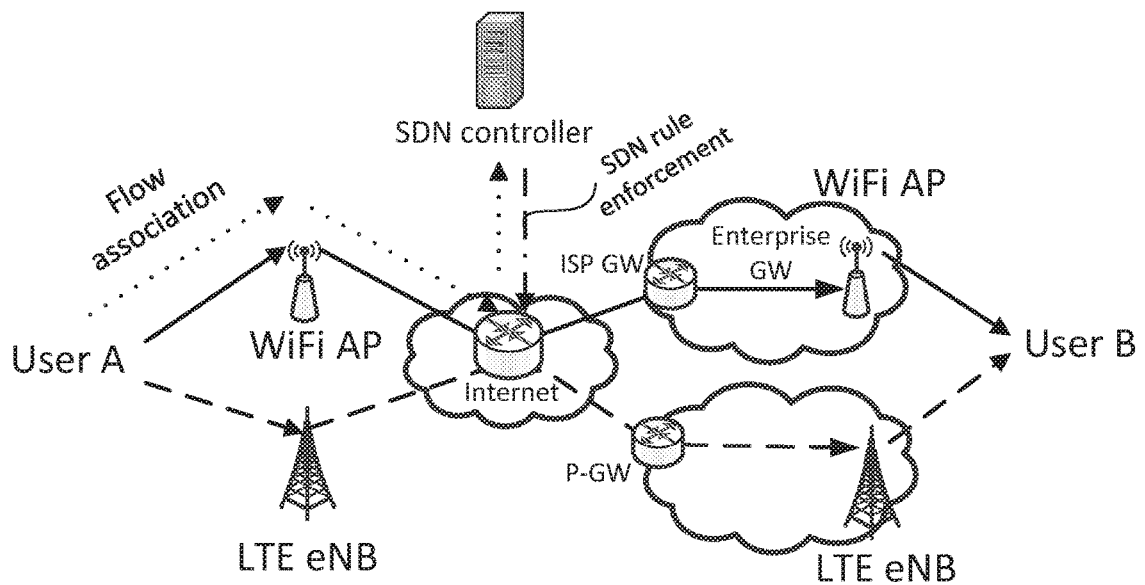
FIG. 3 is a diagram of an example of a Software Defined Network (SDN) approach for shared congested router detection.

FIG. 3 is a diagram of an example of a SDN approach for shared congested router detection. As shown in FIG. 3, participants (e.g., User A and User B) may communicate using a multi-path protocol (e.g., MPTCP, MPRTP). The multipath protocol may use two different interfaces (e.g., LTE and WiFi). User B and/or User A (e.g., one or both of their devices, applications, etc.) may be made aware of the presence of a shared congested router. In an example, User A may send packets to User B. User A may be interested in detecting a shared congested router, for example, with the ulterior motive of maximizing network resource usage for her communications while using them in a fair manner.

The IP address and port numbers for User A's LTE interface used for communication with User B may be designated $A_1, a_1$, respectively. The IP address and port numbers for User A's WiFi interface may be designated $A_2, a_2$, respectively. The IP address and port numbers of User B's LTE and WiFi interface may be designated $B_1$, $b_1$ and $B_2$, $b_2$, respectively. In an example scenario depicted in FIG. 3, multi-path communication may take place between User A LTE—User B LTE interface and User A WiFi—User B WiFi interface. The transport protocol number used for communication between User A LTE—User B LTE interface may be designated $p_1$. The transport protocol number used for communication between User A WiFi—User B WiFi interface may be designated $p_2$. In an example, $p_1$ may be equivalent to $p_2$.

A technique for shared congested router detection and/or avoidance may utilize flow association signaling provided, for example to a SDN controller. A SDN controller may create rules using flow association signaling. Shared congestion information may be shared with a sender and/or receiver.

In an example of flow association signaling, User A may send flow association information to a SDN controller. Flow association may, for example, describe an IP-5 tuple (e.g., source IP address, source port number, destination IP address, destination port number and protocol number) of subflows through which hosts may be connected. As an example, flow association may be the IP-5 tuples of the communication between User A LTE—User B LTE interface, and User A WiFi User B WiFi interface, e.g., $(A_1, a_1, B_1, b_1, p_1)$ and $(A_2, a_2, B_2, b_2, p_2)$.

Figure 4:
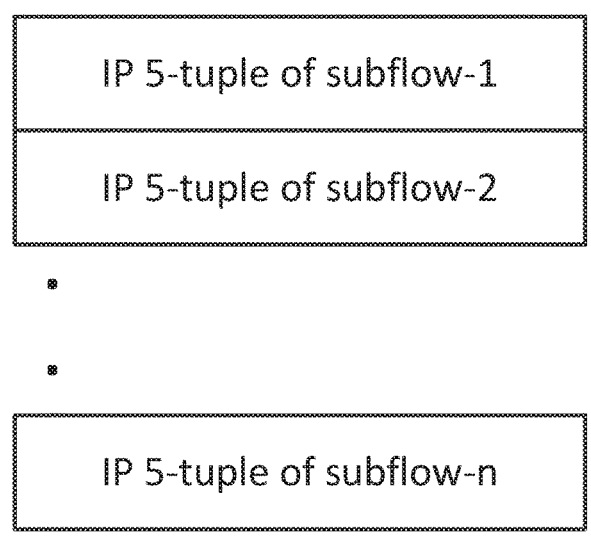
FIG. 4 is an example of a flow association table signaled to a SDN controller by a source.

FIG. 4 is an example of a flow association table signaled to a SDN controller by a source. A source may send the flow association of n subflows, for example, given that the source may be connected to the destination through n independent paths.

Flow association information may be provided to one or more network nodes, e.g., SDN, eNodeB in an LTE system, WiFi AP and so on.

Rules may be created and enforced using flow association signaling. A SDN controller may use flow association signaling, for example, to create rules to prevent and/or detect a shared congestion situation. Rules may be passed on to a switch, for example, from a SDN controller, as shown by dash-dot-dashed arrow ("SDN rule enforcement") in FIG. 3. A switch may enforce the rules on corresponding sub-flows.

There may be any number of subflows. For simplicity, an example with two-subflows is presented. $(FA)_i$ may denote an IP-5 tuple of the $i^{th}$ sub-flow through which User A and User B communicate, which may be obtained by flow association signaling.

A shared congestion situation may be prevented. A SDN controller may have a global view of the network it controls. A SDN controller may, for example, construct a rule to create a routing table for sub-flows so that they do not share a common congested router.

Figure 5:
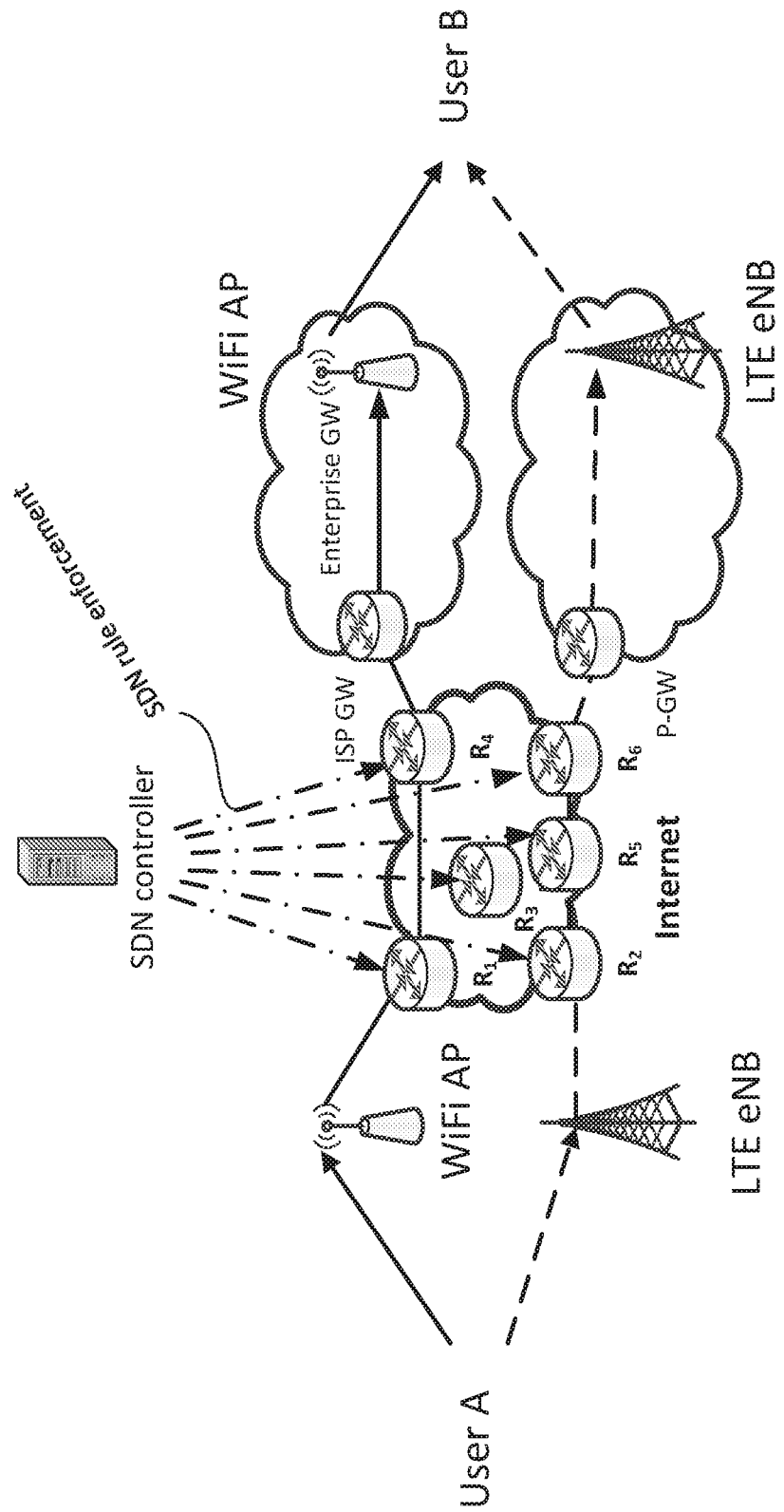
FIG. 5 is an example of congested router prevention by a SDN controller.

FIG. 5 is an example of congested router prevention by a SDN controller. As shown in the example in FIG. 5, the SDN controller controls switches $R_1$ through $R_6$. $(FA)_1$, $(FA)_2$ may represent the IP 5-tuple of WiFi and LTE sub-flows, respectively. The SDN controller may be made aware of the IP 5-tuple of WiFi. and LTE sub-flows, for example, using flow association signaling. Forwarding rules, which may be designed to prevent a shared congested router for flows $(FA)_1$, $(FA)_2$, may be passed by the SDN controller to the switches. TABLE 1 presents an example of forwarding rules promulgated by a SDN controller to switches to prevent a congested router situation in the example shown in FIG. 5.

TABLE 1

| Switch | Flow | Next hop switch |
|--------|------|-----------------|
| $R_1$ | $(FA)_1$ | $R_4$ |
| $R_2$ | $(FA)_2$ | $R_5$ |
| $R_5$ | $(FA)_2$ | $R_6$ |

A SDN controller may use one or more algorithms, which for example may include modified algorithms from graph theory, to devise routes that avoid a shared congested router scenario. A graph theory algorithm may find vertex independent paths, for example, by considering a (e.g., only a) subset of vertices e.g., routers) that are congested.

Figure 6:
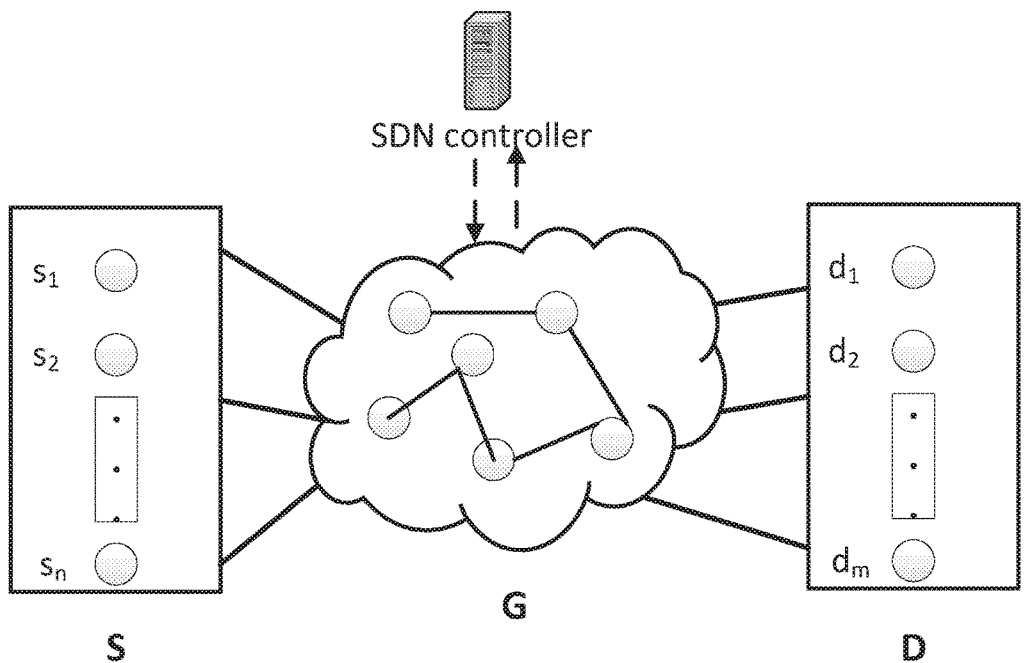
FIG. 6 is an example of a network of switches managed by a SDN controller.

FIG. 6 is an example of a network of switches managed by a SDN controller. A source is designated "S" (e.g., the sender) and a destination is designated "D" (e.g., the receiver). A source and receiver may have multiple interfaces designated $s_i$ (i=1, 2 . . . n) and $d_i$ (i=1, 2 . . . m), respectively. A network of switches between the sender and receiver may be represented as G=(V, E), where V represents the switches and E represents the connections between the switches. Congested switches may be represented by $C \in V$. A SDN controller may be aware of congested switches, C. In an example, one or more (e.g., every) switch may send its current state (e.g., congested/not congested) to a SDN controller.

An example of an algorithm that may be used to prevent a shared congestion situation is presented. A graph, $\tilde{G}=(\tilde{V}, \tilde{E})$ may be constructed, such that, $\tilde{V}=V$, $\tilde{E}=\phi$ (empty set). A link in the network topology, G, may be represented by $e \in E$.

Vertices that are connected by the link, e, may be represented as $v_1, v_2 \in V$. Two directed edges may be constructed, one in each direction between $\tilde{v_1}, \tilde{v_2}$ in $\tilde{G}$, for example, when $v_1 \in C$, or $v_2 \in C$. $\tilde{v_1}, \tilde{v_2}$ represent corresponding vertices of $v_1$, $v_2$ in G. A vertex transformation may be performed for the corresponding vertex $\tilde{v_1}$ in $\tilde{G}$, for example, when $v_1 \in C$. A vertex transformation for $\tilde{v_1}$ may be performed, for example, by replacing the vertex $\tilde{v_1}$ by two vertices $\tilde{v_1^1}, \tilde{v_1^2}$ and connecting them with an edge. A direction of an edge connecting $\tilde{v_1^1}, \tilde{v_1^2}$ may be made to point in such a way that there is a path between $\tilde{v_1^1}, \tilde{v_1^2}$, for example, by taking into account the direction of one or more (e.g., all) edges that $\tilde{v_1^1}, \tilde{v_1^2}$ are connected to. A vertex transformation may be performed for a corresponding vertex $\tilde{v_2}$ in $\tilde{G}$, for example, when $v_2 \in C$. An edge may be constructed between $\tilde{v_1}, \tilde{v_2}$ in $\tilde{G}$, for example, when $v_1 \notin C$, and $v_2 \notin C$. An edge may be undirected, e.g., an edge may be traversed in both directions. The foregoing procedure may be repeated for other edges (e.g., every edge) $e \in C$.

A modified graph, $\tilde{G}$, may use an augmented path algorithm to find vertex independent paths. One or more of the following may be performed, for example, in any order. A breadth first search for the graph $\tilde{G}$ may be performed, for example, to find a path from source to destination respecting the direction of edges. A newly discovered path may be removed from G providing an updated graph, for example, when the algorithm finds the new path through the network. The breadth first search and graph updating may be repeated, for example, until no more paths may be found. Pairs (e.g., every pair) of directed edges that join the same two vertices in opposite directions may be removed from $\tilde{G}$. Edges that are undirected may not be considered, for example, as they denote edges corresponding to uncongested routers corresponding to edge construction when $v_1 \notin C$, and $v_2 \notin C$.

The foregoing procedure may yield q paths. $M=\{m_1, m_2, \ldots m_q\}$ may represent the q paths. A (e.g., each) sub-flow of a multi-path flow may be assigned to a distinct path in M. A SDN controller may send appropriate routing tables that reflect the path assignment to one or more (e.g., all) the switches controlled by the SDN controller.

There may be multiple clients that use multi-path protocol. A SDN controller may set up routing tables to avoid a shared congested router scenario for one or more (e.g., all) clients in one or more (e.g., every) congested router. Avoidance of congested routers for all clients may not be possible. A SDN controller may maximize the number of clients sub-flows avoid the shared congested router situation. A SDN controller may avoid congested routing, for example, based on one or more service level agreements between clients (e.g., users) and the SDN controller. Service level may be based on one or more parameters, such as priority.

A shared congested router situation may be detected by one or more algorithms. Flows that a switch encounters over a time scale of interest, T, may be denoted as $F=\{f_1, f_2, \ldots f_n\}$ or $f_i$ (i=1, 2, \ldots n). A flow may be represented by an IP 5-tuple of a distinct flow that passes through a switch. As an example, F may represent flows passing through a switch over a sliding window of duration, e.g., T=20 seconds. A check may be made whether the IP 5-tuple of some or all of the sub-flows of a multi-path flow are among the flows that pass through a switch with a queuing delay greater than a threshold. e.g., 5 ms. Queuing delays may be compared to determine whether a router is congested, for example, in addition to determining whether sub-flows share the same router.

A shared congested router may be detected, for example, as follows:

```
if (FA)₁ ∈ F and (FA)₂ ∈ F and (queuing_delay) > 5ms)
    congestion_detection = True
else
    congestion_detection = False
``` where queuing_delay may represent the queuing delay experienced at the switch and congestion_detection may be, for example, a one bit field to store the result.

One or more embodiments described herein (e.g., one or more of the rules) may be extended to other scenarios when there are n>2 subflows established, e.g., between User A and User B.

The IP 5-tuples of n subflows established between User A-User B respectively, may be represented as $(FA)_1, \ldots (FA)_n$. Combinations (e.g., all possible combinations) of flow association of size 2, 3, \ldots n may be denoted as S, where $S=\{t_1^2, t_2^2 \ldots t_1^3, t_2^3 \ldots t_1^n, t_2^n \ldots\}$ and $t_j^k$ represents the $j^{th}$ combination of sub-flows of size k. Naturally, $|S|=\Sigma_{i=2}^{n}\binom{n}{i}$. As an example of 3 sub-flows, $S=\{(1,2), (1,3), (2,3), (1,2,3)\}$, $t_1^2=(1,2)$, $t_2^2=(1,3)$, $t_3^2=(2,3)$, $t_1^3=(1,2,3)$ represent the possible combinations of sub-flows that may share a congested router. The index of $t_j^k$ in S may be denoted as $\ell_{kj}$ (e.g., $\ell_{kj}=1, 2, \ldots |S|$). An example of a rule at a SDN controller may be as follows:

```
m = ∅
congestion_detection(i) = False, i = 1,2..|S|
for k=1 to n
    if ( (FA)ₖ ∈ F and (queuing_delay) > 5ms)
        m = m ∪ {k}
    end
end
Find j such that m == tⱼ^|m|
congestion_detection(ℓ|m|j)= True
``` where congestion_detection may be a field of length |S| bits that carries the result of shared router detection of some or all sub-flows.

An example rule may provide shared congested router information, for example, even when a different subset of flows may share bottlenecks in different switches.

Shared congestion information may be communicated to a sender and/or receiver, for example, when the switches have the rules propagated by the SDN controller. A sender/receiver may not be signaled, for example, when routers avoid the shared congested situation, e.g., based on rules promulgated by a SDN controller.

A variety of techniques may be used to signal a sender and/or receiver whether a shared congestion situation exists, e.g., to permit a sender and/or receiver to take appropriate action.

A switch may set one or more bits for packets sent to a sender or receiver, for example, when there are n≥2 sub-flows between User A and User B. A router may set |S| bits in the IP/RTCP/TCP headers, where $|S|=\Sigma_{i=2}^{n}\binom{n}{i}$.

A switch may set a bit to convey the presence of shared congested router, for example, based on the rule(s) provided by the SDN controller. A bit may be set on an IP packet sent to User A or User B. As an example, a switch may use an IP options field to indicate congested router information.

A switch may set a bit on an IP packet addressed to a receiver (e.g., User B). A congested router information bit may be set on an IP packet belonging to a (e.g., any) sub flow that exists between sender and receiver (e.g., User A and User B). User B may receive the IP packet with the congested router information bit set. User B may signal User A, for example, by setting one or more bits, e.g., in the IP options field of the data packet sent to User A, in an extension section of an RTCP report (e.g., in case of MPRTP), in the options field of the TCP header (e.g., in case of MPTCP), etc. A lower number of bits (e.g., one bit) indicating the presence or absence of a shared congested router may reduce communication overhead (e.g., increase efficiency), for example, compared to sending statistics and letting a sender determine whether a situation exists.

A congested router information bit may be set on packets addressed to a sender (e.g., User A), for example, when a reverse flow from User B to User A exists. A switch may set a bit in an IP packet, in an extension section of an RTCP report, in a TCP header option, etc. on a (e.g., any) sub flow addressed to User A, for example, sent by User B. Additional signaling may be performed between User B and User A, e.g., from the receiver back to the sender.

Shared congested router information may be provided to a source, for example, by the SDN controller signaling shared congestion information.

Figure 7:
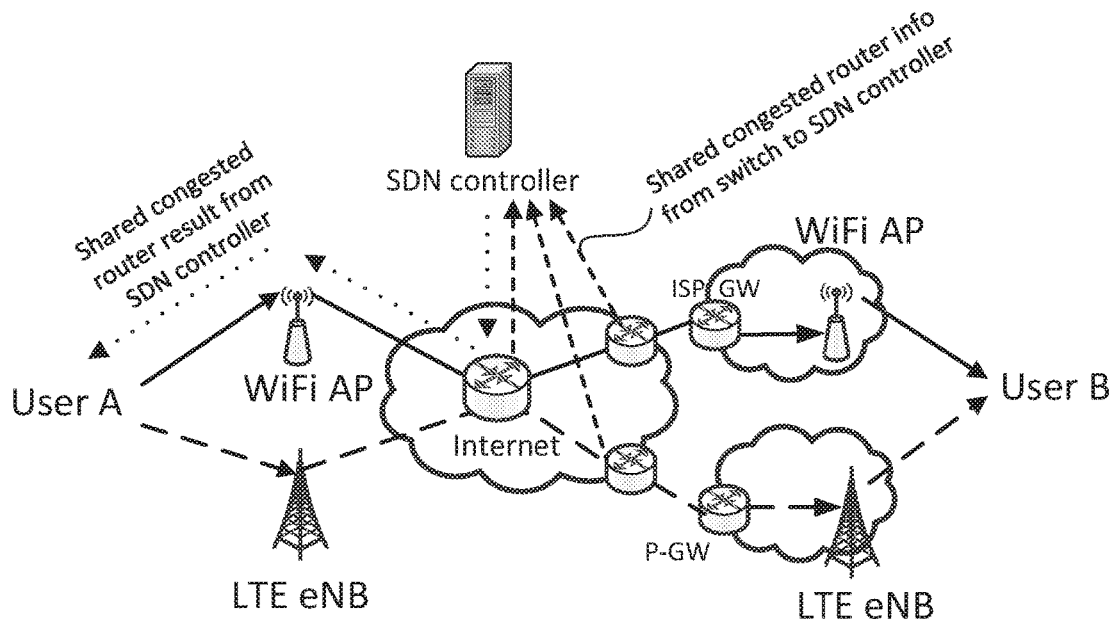
FIG. 7 is diagram of an example of a SDN controller signaling the result of shared congestion information to a source.

FIG. 7 is diagram of an example of a SDN controller signaling the result of shared congestion information to a source. A (e.g., each) switch may compute shared congestion information, for example, using a rule provided by a SDN controller. A switch may signal a result, e.g., from applying a rule, back to the SDN controller, as indicated by short-dashed lines in FIG. 7 (marked "Shared congested router info from switch to SDN controller"). Information provided by a switch to a SDN controller may be a message of length |S| bits, which may represent the combination of sub-flows sharing the congested switch. A SDN controller may, for example, compute a bitwise logical OR of the messages received from switches and signal the result bad(to sender, as indicated by dotted lines in FIG. 7 (marked "Shared congested router result from SDN controller").

Figure 8:
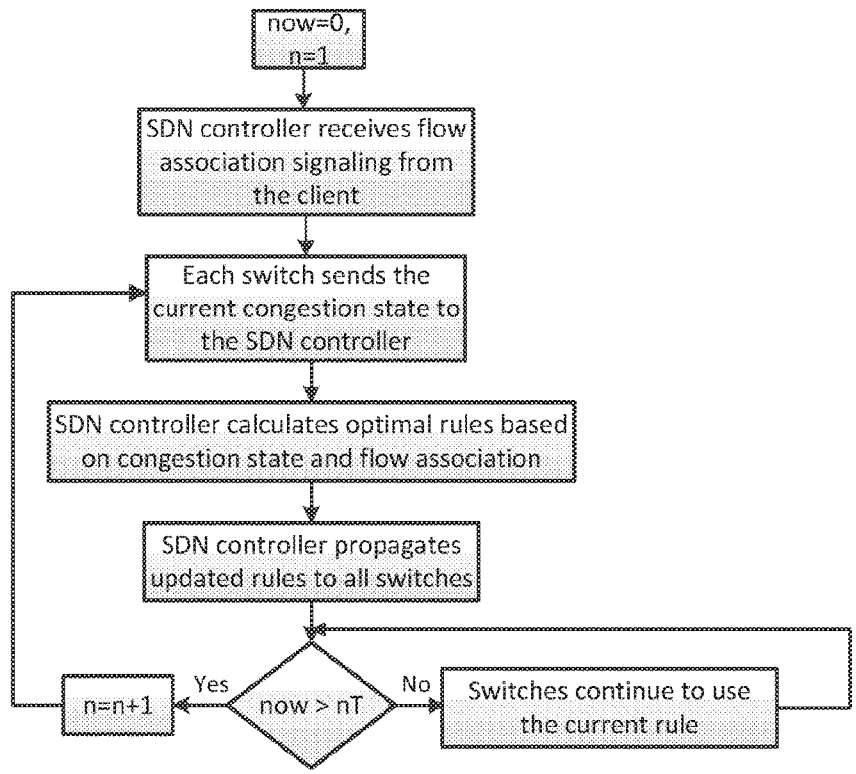
FIG. 8 is a flow diagram of an example of SDN assisted shared congested router prevention and detection.

FIG. 8 is a flow diagram of an example of SDN assisted shared congested router prevention and detection. FIG. 8 presents an example sequence of events in SDN assisted shared congested router detection and prevention, where for example, "now" may represent the current time. The rules may be updated by the SDN controller every T seconds.

Multi-path protocols, e.g., MPTCP, MPRTP, may leverage the result of congested router detection, for example, to enhance their throughputs while maintaining fairness to competing flows.

Shared congested router information may be leveraged, for example, by "joint congestion control." Joint congestion control may be exercised at the sender (e.g., which may lead to lower throughputs), for example, when the sub-flows of a multi-path flow share a congested router. Sub-flows may be treated as independent flows, for example, when sub-flows do not share a congested router. Sub-flows may be treated as independent flows, for example, by performing independent congestion control, which may yield higher throughputs.

In an example where MPTCP has two subfloors, $w_i$ (i=1, 2) may denote the congestion window size of two sub-flows, respectively, and $w=w_1+w_2$. The congestion windows of sub-flows may evolve independently $$\left(e.g., w_i = w_i + \frac{1}{w_i}\right),$$

for example, when the two subfloors do not share a congested router. The congestion windows of subfloors may evolve dependently by coupled congestion control $$\left(e.g., w_i = w_i + \min\left(\frac{\alpha}{w}, \frac{1}{w_i}\right)\right),$$

for example, when the sub-flows share a congested router (e.g., congestion_detection=True in an algorithm described with respect to an example described herein of a rule at a SDN controller), where α may be chosen.

Dynamic Adaptive Streaming over HTTP (DASH) may benefit from shared congested router information, for example, when DASH is used over MPTCP. As an example, a DASH client may be aggressive in requesting higher quality video segments, for example, when it may be made aware of the absence of shared congested router. Lower to moderate quality video segments may be requested, for example, when a shared congested router exists.

In an example of two sub-flows in MPRTP, $r_1$, $r_2$ may denote available bandwidth reported by a congestion control algorithm of sub-flows and $y_1$, $y_2$ may denote the rate at which packets are sent through the sub-flows, respectively. A sending rate of a (e.g., each) sub-flow may evolve independently (e.g., $w_i=r_i$ (i=1, 2)), for example, when sub-flows do not share a congested router.

A joint congestion control may be devised when sub-flows share a congested router. An example of a technique for setting the sending rate for sub-flow i may be $$y_i = \frac{r_i}{\sum r_i} \max_i r_i.$$

In MPRTP joint congestion control, the total sending rate of all sub-flows may be constrained, for example, to be equal to the maximum of the available bandwidth of some or all sub-flows, which may be denoted by $$\max_i r_i.$$

A sending rate of a each) sub-flow may be proportional to the ratio of the subflow's available bandwidth to the total available bandwidth.

Techniques may be applied when there are more than two sub-flows. A joint congestion control may be applied to (e.g., only to) sub-flows that share a congested router. In an example with four sub-flows numbered [1,2,3,4], joint congestion control may be provided for flows (1,3) that share a congested router while independent congestion control may be provided for flows (2,4) that do not share a congested router.

Figure 9:
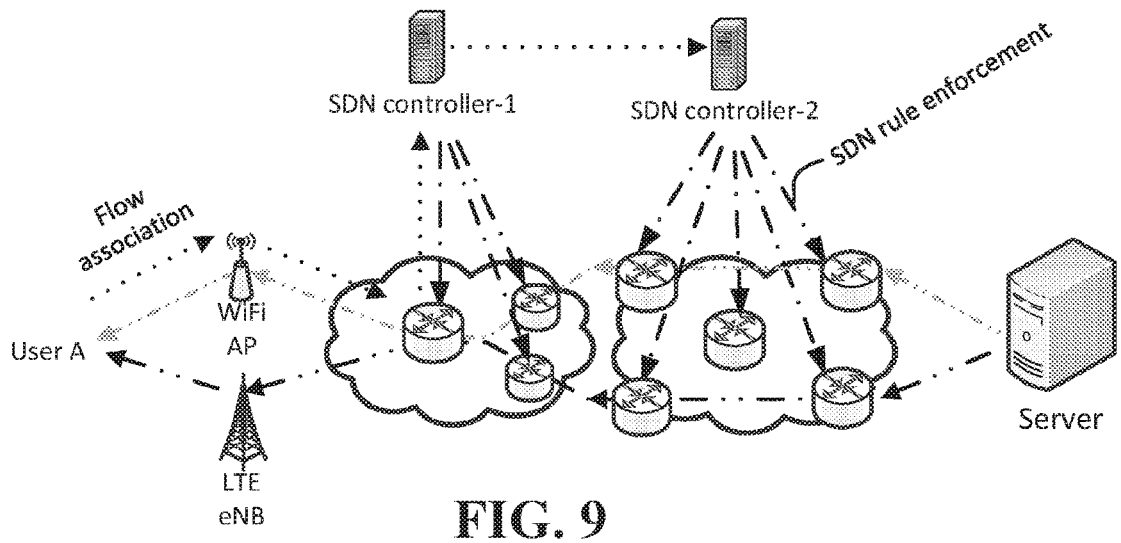
FIG. 9 is a graph of an example of multiple SDN controllers along a path between endpoints.

FIG. 9 depicts a scenario where there are multiple SDN controllers along a path between endpoints. There may be one or more SDN controllers along the path between endpoints, e.g., a source and a destination. In an example shown in FIG. 9, there are two SDN controllers, e.g., SDN Controller-1 and SDN controller-2. A SDN controller may control its autonomous system (AS). For example, in FIG. 9 SDN controller-1 may control an AS comprising multiple routers controllable by SDN controller-1 (illustrated as three routers in the left cloud as an example), and likewise SDN controller-2 may control an AS comprising multiple routers controllable by SDN controller-2 (illustrated as five routers in the right cloud as an example). In an example of a streaming use case, data may be streamed to User A from the Server through multiple paths using a multi-path protocol and User A may provide flow association signaling. Alternatively, the server may provide the flow association signaling.

User A may send flow association signaling to the SDN controller associated to the network User A is connected to (e.g., SDN controller-1), SDN controller-1 may propagate one or more rules to the switches it controls. Rules may be based on the received flow association signaling. SDN controller-1 may transmit flow association signaling to the next hop SDN controller, e.g., SDN controller-2. SDN controller-2 may propagate the rules to the switches it controls, for example, based on the flow association signaling received from SDN controller-1, A similar protocol may be applied, for example, when the Server and/or the end points (e.g., User A and Sever) send flow association signaling to the SDN controller associated to the network they are connected to.

Figure 10:
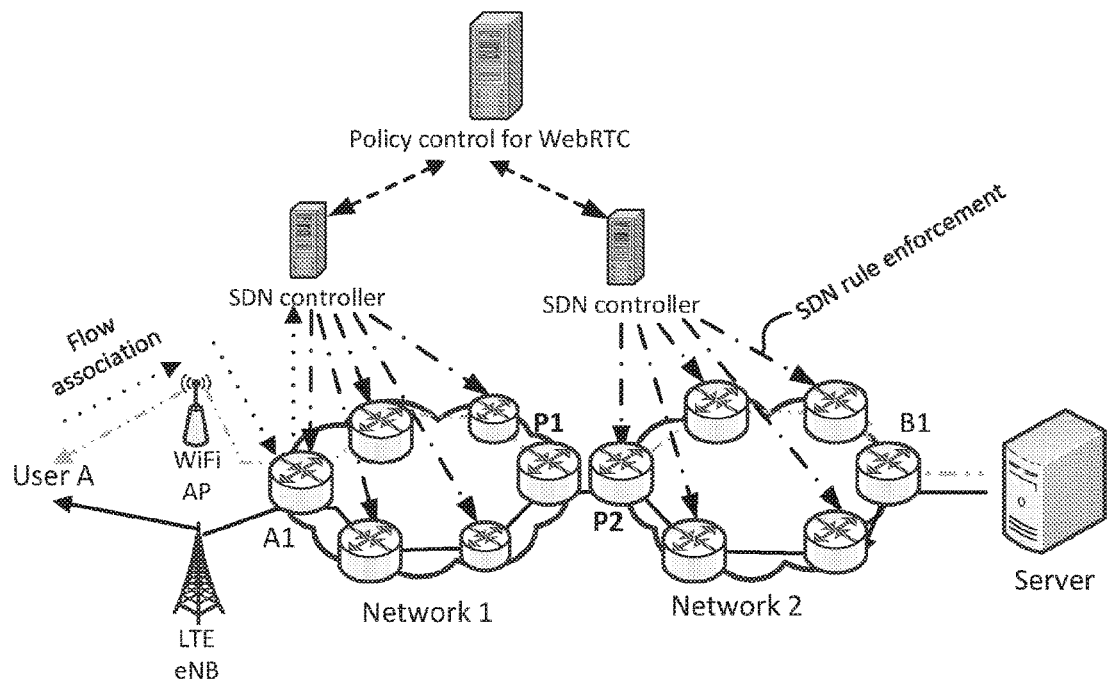
FIG. 10 is a diagram of an example of policy-based SDN control management.

The scalability of the approach may be implemented by limiting the proposed approach to selected protocols (e.g., represented through or detected by port number, for example, rather than applying the technique to any/all multipath-based protocols). For example, the multi-path flow routing may be enforced on WebRTC applications. Further, a policy based control may be enforced by the application provider, such as depicted in FIG. 10.

An application provider (e.g., WebRTC) may get network slices from all service providers and deploy the proposed approach to enhance QoE. The policy based application control server may directly manage every network slice (obtained by the provider), through the SDN controller as shown in FIG. 10. The policies provided by the application provider may identify the applications for which multi-path flow policies may be enforced, and may also define or describe how they have to be managed.

For example, the policy may define the following. A unique packet identifier that corresponds to a specific application (e.g., WebRTC) may be defined. Multi-path management of sub-flows may be provided. For example, a number of disjoint paths that the routing algorithm may require may be determined. As an example, for a multi-path flow that has 'n' subflows, the policy server may specify that it may be enough to find 'm' disjoint paths, where m<n, instead of the having a default scenario such as m=n. This may be done if the number of sub-flows (in a multi-path flow) is large, and hence it may be difficult to find disjoint paths that equal the number of sub-flows in a multi-path flow. The policy may specify the routing protocols for finding optimal disjoint paths (for example, based on some cost metric such as shortest path etc.). The policy may provide for how the shared congested router detection information is sent back to the source. For example, switch setting bits on packets sent to the sender or receiver may be provided. In another example, signaling the result of congested router information to the source by the SDN controller may be provided.

The action taken by the SDN controller to enforce the policy on the flows may be provided by passing appropriate rules to the switches it controls. In this manner, an application provider may directly and dynamically control its network slices. Dedicated APIs may control the communication between the policy control web server and the SDN controllers. APIs may be used for indirect communication between two SDN controllers, thereby avoiding a direct SDN controller interaction. For example, a policy control web server may act as an 'relay' between two SDN controllers, thereby being able to pass on the state information of one SDN controller to another SDN controller through custom APIs developed by the application provider. State information may refer to information to be passed from one network to other networks to achieve the desired outcome. For example, the state information in multi-path protocol may be the flow association signaling.

An API for sending information from the policy server to the first SDN controller (such as the SDN controller of 'Network 1' in FIG. 10) may allow the policy server to specify, for example, unique packet identifiers, multi-path management of sub-flows, routing protocols, and methods of passing the shared congested router detection information back to the source. The SDN controller may send an acknowledgement back to the policy web server to confirm receipt of a new policy or policy update.

An API for sending information from the SDN controller to the policy web server may allow the SDN controller to convey, for example, flow association signaling (e.g., indicating the sub-flows of a multipath flow) which in turn may enable the policy web server to relay this information to an SDN controller of other networks. The API for sending information from the SDN controller to the policy web server may allow the SDN controller to indicate the load of the network handled by the SDN controller (which the SDN controller may obtain through feedback from the switches it controls), that may enable the policy server to adapt the policy based on the load experienced by the network. For example, if the load on the network is high, the policy server may enforce less computationally intensive policies to improve performance.

An API for sending information from the policy web server to a second SDN controller (such as, for example, SDN controller for 'Network 2' depicted in FIG. 10) may allow the policy web server to convey flow association signaling passed on by other SDN controllers and/or unique packet identifiers, multi-path management of sub-flows, routing protocols, and/or methods of passing detection information back to a source.

Information regarding the state or conditions of a network may be passed on to another network, for example, by way of peering points. That is, the ingress router of a network where the intelligence pertaining to the application may be available (as an example, router B1 in FIG. 10) may pass on the state information to the peering point egress router P2 in its network. Assuming that the networks have an agreement, the peering point egress router P2 of network 2 may pass on its network state information to the ingress peering point router P1 of network 1.

Figure 11:
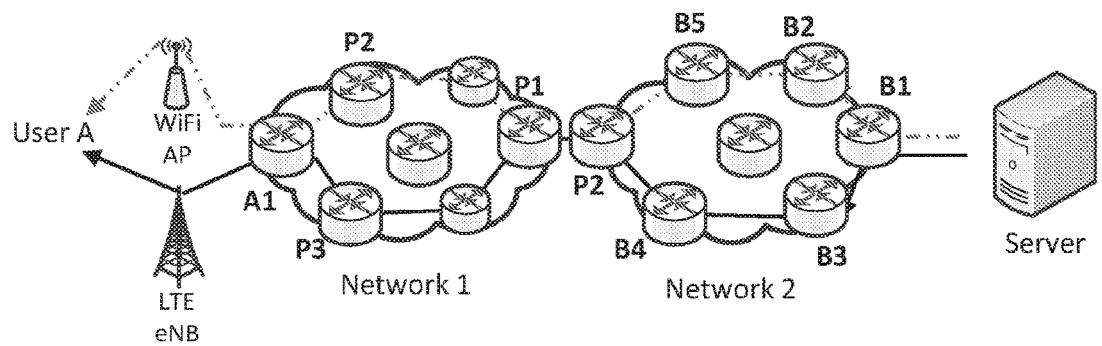
FIG. 11 is a diagram of an example of Multipath Bit Index Explicit Replication (MBIER)-based multi-path flow routing using peering points.
Figures 12, 13:
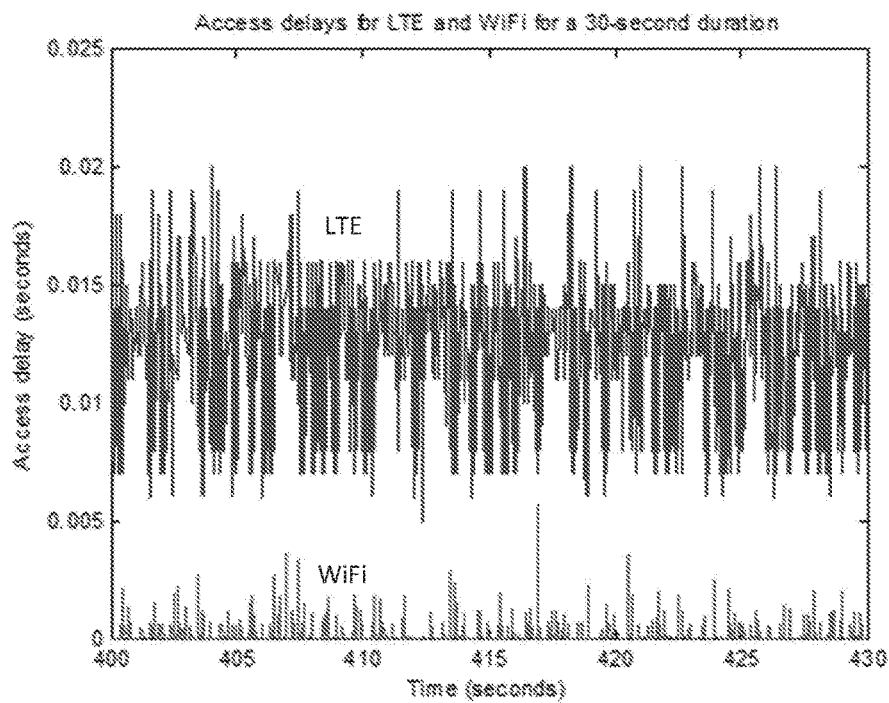
FIG. 12 is a diagram of an example Bit Index Explicit Replication (BIER)/MBIER header.
FIG. 13 is an example of wireless access delay variations for LTE and WiFi in a 30 second duration.

FIG. 11 depicts a Multipath Bit Index Explicit Replication (MBIER)-based multi-path flow routing using peering points. Multi-path flow routing may be effected so as to avoid a shared congested router (for example, without using SDN controller). In Bit Index Explicit Replication (BIER), when a multicast data packet enters the domain, the ingress router may encapsulate the packet in a BIER header. FIG. 12 depicts an example BIER header. The BIER, header may contain a bit-string (e.g., "BitString" in FIG. 12), in which each bit represents an egress router in the domain; to forward the packet to a given set of egress routers, the bits corresponding to those routers are set in the BIER header. The first 4 bits in the header may be set to 0101 (e.g.; so that the BIER header may not be confused with the IP header), for example, so that the routers know how to handle the packet with the header.

In MBIER, the header may be set to some unique value (e.g., to avoid confusion with other headers, such as, for example, IP headers, BIER headers, etc.). For example, in FIG. 12, the MBIER header may be set to 0110. Other fields in the MBIER header may be similar to the BIER header.

The following describes how the ingress router B1 of network 2 in FIG. 11 may handle a packet belonging to a multi-path flow. An ingress router (for example, B1) may know the routes that correspond to the disjoint paths (such as, for example, by employing an algorithm described herein for finding disjoint paths).

The ingress router may receive an incoming packet belonging to a sub-flow of a multi-path protocol. Based on a sub-flow id of the multi-path protocol, the ingress router may determine the route that the packet should take. The ingress router may encapsulate the received packet in the MBIER header with the "BitString" field value corresponding to the routers through which the packet may need to traverse. In FIG. 11, for packets belonging to the sub-flow shown along the top of the figure, the bits corresponding to routers B2 and B5 may be enabled. The "BitString" field may be provided such that each bit represents one router in the network. The encapsulated packet in the MBIER header may be transmitted.

The encapsulated packet may reach one or more intermediate routers in the network (e.g., not the ingress or egress router). An intermediate router may reset (for example, disable) the bit (e.g., in the 'BitString' field) that corresponds to itself in the MINER header. If the bit corresponding to the intermediate router is not reset, the forwarding may continue in an infinite loop.

Forwarding through intermediate routers may continue until the packet reaches the egress router (e.g. egress router P2 of network 2). The egress router upon receiving the packet may remove the MBIER header and forward the packet to a peering router in another network. Flow association information may be exchanged between peering points (e.g., P2 and P1 in FIG. 11). A peering router (such as P2 in FIG. 11) may be aware of flow association information obtained from an ingress router (such as B1 in FIG. 11). The peering router P2 and the ingress router B1 may be in the same network (e.g., network 2). Flow association information may, for example, be signaled from the ingress router (e.g., B1) to the peering router (e.g., P2) via the network (e.g., network 2). The ingress router may be aware of flow association information, for example, through explicit signaling by a user or by other means.

A method of controlling a network of routers comprising an ingress router, at least one intermediate router, and an egress router may comprise receiving, with the ingress router, a packet belonging to a sub-flow of a multi-path protocol. The ingress router may determine a routing path for the packet based on a sub-flow id of the multi-path protocol, encapsulate the packet in an MBIER header with a BitString field value corresponding to the routers of the routing path, and send the encapsulated packet to the next router of the routing path. An intermediate router may receive the packet, reset a bit of the BitString field corresponding to the intermediate router, and send the packet to the egress router. The egress router may receive the packet, remove the 4181 FR header, and send the packet to a peering router in another network.

A shared congested router may be detected using an end-to-end algorithm. Detection of shared congested routers in wireless systems with wireless delays poses an added difficulty relative to wired systems. An active approach to detection may, for example, incur communication overhead using probe packets to obtain one way end-to-end delay of different paths, where cross correlation metrics may be used to find similarity of queuing delay statistics. A passive approach to detection may be used without incurring communication overhead. In wireless scenarios, statistics of inter-arrival times of packets may be altered, e.g., drastically due to varying LTE and WiFi access delays in wireless links at the source and destination.

An end-to-end algorithm to detect a shared congested router may use a one way end-to-end delay of data packets to infer the presence of a shared congested router. A one way end-to-end delay may be composed of wireless access delays, link delays and queuing delays. Queuing delays may make it difficult to estimate other delays. The order in which packets are received at the destination through multiple paths may be different from the order in which they experience congestion at a shared congested router, for example, due to varying access delays across wireless links and varying delays through different links in networks, e.g., the Internet. These issues may be addressed in an algorithm, for example, to reliably detect a shared congested router.

A shared congested router detection algorithm for a wireless scenario is introduced by describing a detection algorithm for a wired scenario using data packets. In wired scenarios, an estimate of a queuing delay of packets may be obtained from a one way end-to-end delay. A one way end-to-end delay of packets may be the sum of the link delays and the queuing delays. A link delay may be considered constant for a particular path during the time interval of interest. A one way end-to-end delay may be given by Eq. 1.

$$d_i(t) = \ell_i + q_i(t)$$ Eq. 1

In Eq. 1, $d_i(t)$, $\ell_i$, and $q_i(t)$ represent a one way end-to-end delay, link delays and queuing delays, respectively, at time t for packets received through an $i^{th}$ path. An estimate of the link delay for path i may be estimated as $\hat{\ell}_i = \min_t d_i(t)$. An assumption may be made that the queuing delay, $q_i(t)$, approaches zero $q_i(t) \approx 0$ at some instant t, such that the running minimum of one way delay may provide an estimate of link delays, $\hat{\ell}_i$. An estimate of queuing delay for the $i^{th}$ flow may be, $\hat{q}_i(t) = d_i(t) - \hat{\ell}_i$. Similarity metrics may be used to infer a shared congested router.

A wireless scenario accounts for wireless access delay component to infer a queuing delay. While a link delay may be presumed to be constant, wireless access delays may vary over time.

FIG. 13 is an example of wireless access delay variations for LTE and WiFi in a 30 second duration. Note that the delays are not similar. This demonstrates that statistics may not be assumed to be similar across different interfaces (e.g., LTE and WiFi). A one way end-to-end delay for a wireless scenario may be given by Eq. 2.

$$d_i(t) = \ell_i + a_i(t) + q_i(t)$$ Eq. 2

In Eq. 2, is the access delay for path at time 1.

An algorithm for shared congested router detection for wireless scenarios may estimate queuing delay variation, as opposed to queuing delay, from a one way end-to-end delay. An estimate of queuing delay variation may be unbiased. Packets that are received through multiple paths at the destination may be time aligned, for example, based on the likelihood of having experienced congestion at the shared router. A time aligned queuing delay variation may be used to infer the presence of a shared router. An estimate on the upper bound of a queuing delay imay be obtained from the one way end-to-end delay. A decision (e.g., a final decision) on shared congested router detection may be declared, for example, based on the inferred state (presence or absence of a shared congested router) and the upper bound estimate.

While shared router detection may performed, for example, based on an estimate of a queuing delay variation and/or time aligned queuing delay variation, an estimate on the upper bound of the queuing delay may provide additional "side" information that may be used, for example, to infer whether the shared router is congested or not. An algorithm may be applied in multiple cases (e.g., two cases), such as when wireless access delays are stationary and non-stationary.

An algorithm may be applicable when wireless access delays are stationary. One way end-to-end delay of packet j, received from the $i^{th}$ path during the time interval [mT, (m+1)T], may be denoted as $f_i^m(j)$. T may be the time duration over which packets from both paths are analyzed for shared congested router detection. A mean of the one way end-to-end delay of packets received in the path during the time interval [0, T] may be denoted as $\hat{M}_i$. A queuing delay variation $s_i(j)$ may be defined by Eq. 3.

$$s_i(j) = f_i^m(j) - \hat{M}_i \qquad \text{Eq. 3}$$

A theorem that Eq. 3 is unbiased may be designated Lemma 1.

$\hat{M}_i$ may be a random variable that represents a realization of the mean of a one way end-to-end delay of packets received in an $i^{th}$ path. The expected value of $\hat{M}_i$ (e.g., where the expectation is over the distribution of the mean of the one-way delay of the $i^{th}$ path) may represent the true value of the mean, $s_i(j)$, which is defined in Lemma 1, is an unbiased estimate. $\hat{M}_i$ may represent a sum of the mean of queuing delay ($q_i(t)$), wireless access delay ($a_i(t)$), and link delays ($\ell_i(t)$), of the $i^{th}$ path. $s_i(j)$ may represent how a queuing delay varies with time, for example, when it is assumed that wireless access delays are stationary, link delays are constant for $i^{th}$ path and queuing delays may be stationary or non-stationary.

$\hat{M}_i$ may be updated every P seconds (where P>>T) for the calculation of $s_i(j)$. A periodically updated $\hat{M}_i$ may represent a mean of one way end-to-end delay of packets received in the $i^{th}$ path during time interval [mP, mP+T]. Updating $\hat{M}_i$ may permit use of a more recent estimate of $\hat{M}_i$ and provide an updated estimate of the queuing delay variation. An estimate of $\hat{M}_i$ during the first time interval [0, T] may become outdated, for example, when detection is performed over a long time period.

Relative time alignment may be considered, for example, when analyzing queuing delay variation of packets obtained through multiple paths. The order in which packets are received at the destination from LTE and WiFi paths may be different from the order in which the LTE and WiFi packets experience congestion at a shared router.

FIG. 14 is a diagram of an example of out of order and assymetric handling of packets. The order in which LTE and WiFi packets experience congestion at a shared router may be different from the order in which packets are received at the destination, for example, due to wireless access delays and asymmetric aggregate link delays.

As an example, packets received through an LTE interface may be shifted relative to packets received at a WiFi interface at a destination, even though similar numbered LTE and WiFi packets may experience congestion at a shared router depicted in FIG. 14. Disparate treatment may be due to asymmetric aggregate link delays from a shared router to destination interfaces and/or due to different wireless access delays. A relative time lag between packets received through different paths may be estimated, for example, by calculating a cross correlation coefficient at some or all possible lags between packets received through different interfaces. A lag with a highest cross correlation coefficient may be selected, for example, to time align packet sequences.

A general trend in queuing delay variation may be obtained, for example, by smoothing time aligned sequences obtained from each path using an exponential weighted moving average filter. A smoothed queuing delay variation may be given by Eq. 4.

$$\tilde{s}_i(n) = \alpha s_i(n) + (1-\alpha)\tilde{s}_i(n-1) \qquad \text{Eq. 4}$$

In Eq. 4, $\tilde{s}_i(n), s_i(n)$ represents a smoothed queuing delay variation and a time aligned queuing delay variation of packet $l_i$ received through the $i^{th}$ path, respectively. A smoothing factor may be designated $\alpha$.

FIGS. 15A and 15B are examples of a one way end-to-end delay of packets received through LTE and WiFi paths for shared and non-shared cases, respectively.

FIGS. 16A and 16B are examples of queuing delay variation for shared and non-shared scenarios, respectively, for example, after performing one or more of the following operations: (i) obtaining an unbiased estimate of queuing delay variation using Eq. 3 (Lemma 1), (ii) time alignment and/or (iii) smoothing.

An inference may be used, for example, to declare whether packets share the same congested router given the smoothed trend of the queuing delay variation of packets of each path. An inference may be performed using several techniques. In an example, $\hat{s}_i$ may represent the mean of smoothed queuing delay variation of the $i^{th}$ flow. The percentage variation between two flows may be defined as, $$p(\hat{s}_1, \hat{s}_2) = \frac{\max(\hat{s}_1, \hat{s}_2) - \min(\hat{s}_1, \hat{s}_2)}{\min(\hat{s}_1, \hat{s}_2)}$$

over a T sec interval. Given thresholds $\tau_1$ and $\tau_2$, where $\tau_1 < \tau_2$, it may be an indication that flows do not share a congested router, for example, when $p(\hat{s}_1, \hat{s}_2)$ is greater than threshold $\tau_2$. It may be an indication that flows share a congested router, for example, when $p(\hat{s}_1, \hat{s}_2)$ is less than threshold $\tau_1$.

Flows may share a congested router, for example, when $p(\hat{s}_1, \hat{s}_2)$ lies between $[\tau_1, \tau_2]$ and a correlation coefficient between the flows is above a threshold, z. Flows may not share a congested router, for example, when $p(\hat{s}_1, \hat{s}_2)$ lies between $[\tau_1, \tau_2]$ and a correlation coefficient between the flows is below a threshold, z. A rationale for this approach may be, for example, that when $\hat{s}_1, \hat{s}_2$ are close, such that $p(\hat{s}_1, \hat{s}_2) \in [\tau_1, \tau_2]$, a statistical similarity of the two flows may be used to infer the existence or non-existence of a shared congestion state. A hysteresis timer may be used to transition from shared state to non-shared and vice-versa when conditions for shared or non-shared conditions have been satisfied for a period of time, e.g., at least $\tilde{T}$ seconds, to avoid a "ping-pong" effect.

An upper hound for a queuing delay may be given by Eq. 5, which may be referred to as Lemma 2.

$$y_i^m(j) = f_i^m(j) - \min_{0,1...m-1} \hat{f}_i^m \qquad \text{Eq. 5}$$

In Eq. 5, $y_i^m(j)$, $f_i^m(j)$ may represent an upper bound on queuing delay and a one way end-to-end delay, respectively, for packet t received through an path during a time interval [mT, (m+1)T]. A mean of one way end-to-end delay of packets received in the $i^{th}$ path during the time interval [mT, (m+1)T] may be designated $\hat{f}_i^m$. The "min" term in Eq. 5 may represent a minimum of a sum of mean queuing delays, link delays and wireless access delays observed thus far. An assumption may be made that a queuing delay approaches zero and wireless access delay reaches a minimum over an interval T. A running "min" term may provide an estimate of a minimum wireless access delay and constant link delay. In Eq. 5, $y_i^m(j)$ may represent an upper bound on a queuing delay.

An inference whether flows share a congested router, in conjunction with an upper bound in Eq. 5, may be used to declare a final state. In an example, a final state may be declared to be non-shared, for example, when an inference is that the flows do share a router and an upper bound on a queuing delay is less than 5 ms. A rationale for the final state declaration may be that the shared router is not congested given that the upper bound on the queuing delay is less than 5 ms. A determination that there is not a shared congested router may permit a sender to use multiple (e.g., two) paths independently, e.g., as if they were two separate flows, for example, to provide more throughput without being unfair to competing flows at the shared router.

Detection algorithms may be applicable when wireless access delays are non-stationary. Algorithms applicable for stationary wireless access delays may be used for non-stationary wireless access delays. An inaccurate detection may not have a detrimental impact. In an example, an unbiased estimate in Lemma 1 may not provide an estimate of queuing delay variation.

In an example where an LTE network may become congested, an LTE wireless access delay may increase faster than a queuing delay and a WiFi network may experience typical wireless access delays while LTE and WiFi paths share a congested router in the Internet. An unbiased estimate of Lemma 1 for packets received through the LTE interface may be dominated by the wireless access delay while packets received through a WiFi interface may be dominated by queuing delay variation. A difference between the unbiased estimate of packets received through LTE and WiFi may exhibit diverging behaviour given that the access delays in LTE dominate the queuing delays, which may misleadingly indicate the flows do not share a congested router when they do. An inference that the LTE and WiFi paths do not share a congested router may lead to use of independent congestion control for LTE and WiFi paths to increase throughput. With higher LTE wireless access delays, transmission of packets through the LTE interface may be limited and the total throughput (e.g., sum of rates of LTE and WiFi) may be slightly higher (e.g., only slightly higher) than that offered by WiFi alone, thereby sending slightly more traffic to the shared congested router. Despite a mis-detection in declaring a shared state of flows at the router, there may be no detrimental impact caused due to an incorrect inference.

A detection algorithm may be implemented, for example, in MPRTP and MPTCP. One way end-to-end delay of packets may be observed at the RIP layer, for example, in the case of real time protocols (e.g., such as RIP or MPRTP). Time stamps may not be unique on a packet-level. As an example, time stamps of video packets may be unique on a frame-level. Packets that belong to a video frame may have the same time stamps. Calculating the one way delay of packets may be performed at a resolution of a frame level, which may be insufficient. An extended RTP header may be used, for example, by having a sender place a sending time stamp of an (e.g., each) RIP packet. The receiver may infer the one way end-to-end delay, for example, from the receiving time of an (e.g., every) RIP packet and the sending time stamp present in the extension header. The results of detection (e.g., shared or non-shared congested router) may be communicated to a sender, for example, using one bit in profile specific extension of the receiver report RTCP packet.

An end-to-end approach for shared congested router detection may be provided. In an example, a one way end-to-end delay may be used. A receiver may perform detection. A receiver may signal a sender about the detection, e.g., of the presence or absence of a shared congested router.

One way delay estimation may be performed for TCP or MPTCP, for example, at a transport layer at the sender. ACKs may be sent for one or more (e.g., every) segment by the receiver. A sender may calculate the one way end-to-end delay for every packet to be RTT/2, where RTT is the round trip time. ACKs may not be sent, for example, when a delayed ACK option is enabled. A delayed ACK option may interfere with the one way delay estimate for every segment, for example, when ACKs are not received for every transmitted segment. A TCP sender may calculate a one way delay for (e.g., only for) a latest segment for which ACK is received. A TCP receiver may send a cumulative acknowledgement for the latest received segment that represents ACK for more than one segment, for example, when the TCP receiver obtains a retransmitted packet that has a lower sequence number than that of a segment that has already reached the receiver. A TCP sender may estimate the one way delay, for example, from the time the retransmission was perfumed until the time a cumulative ACK (or ACK) is received. A sender may then use an inference algorithm.

Figure 17:
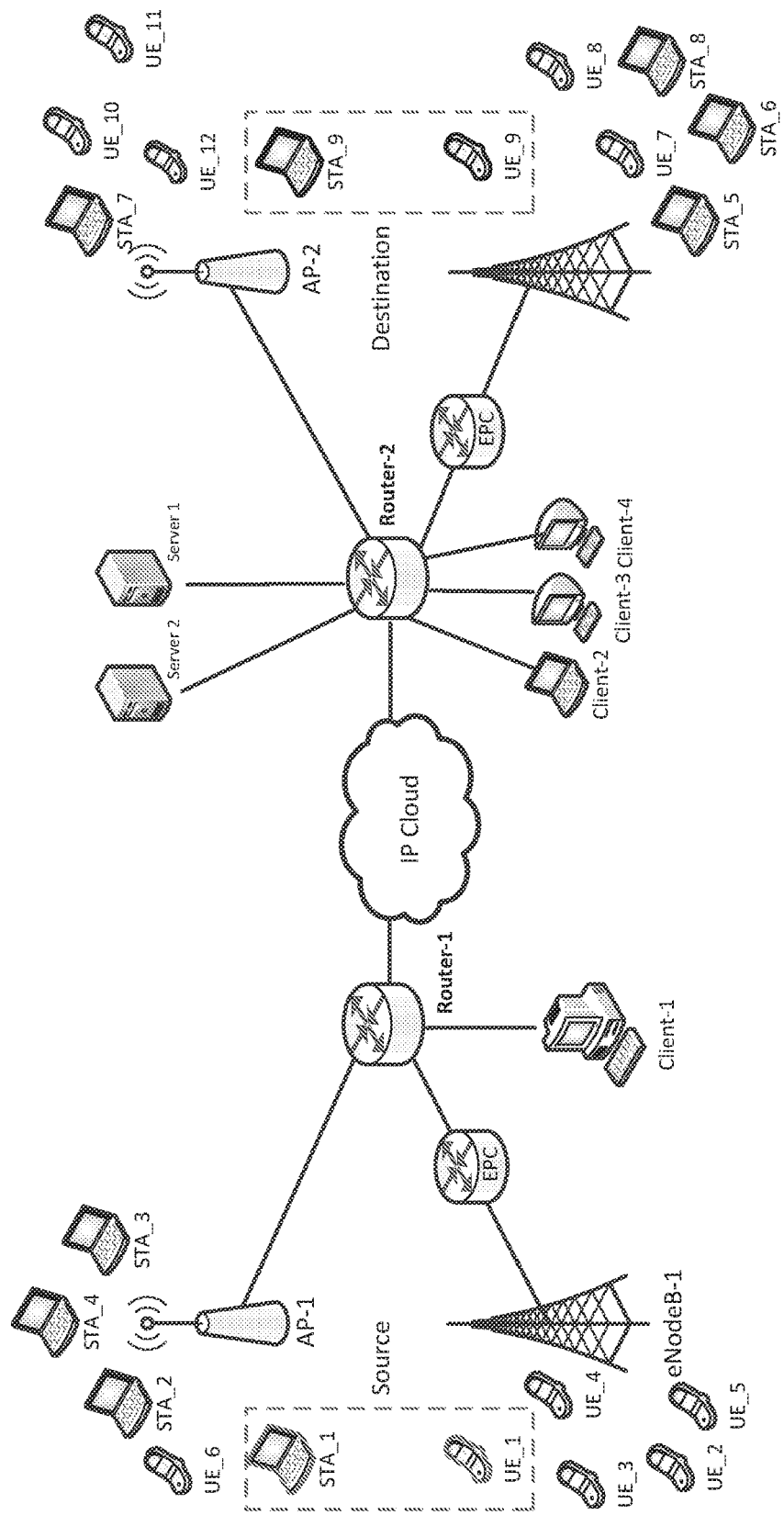
FIG. 17 is a diagram of an example of a shared network scenario comprising LTE and WiFi interfaces.
Figure 18:
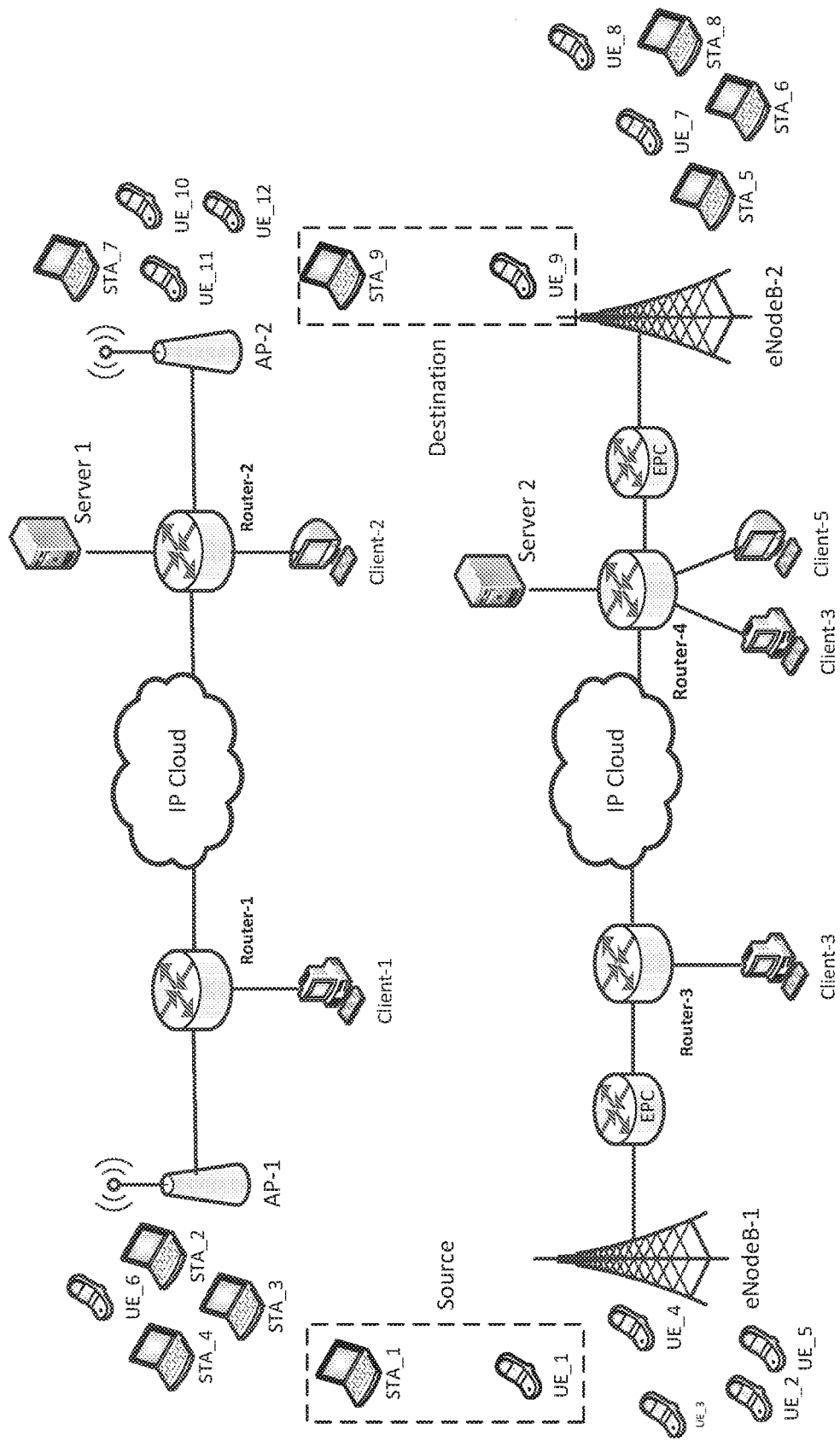
FIG. 18 is a diagram of an example of a non-shared network scenario comprising LTE and WiFi interfaces.

FIG. 17 is a diagram of an example of a shared network scenario comprising LTE and WiFi interfaces. FIG. 18 is a diagram of an example of a non-shared network scenario comprising LTE and WiFi interfaces.

Simulations performed, for example, in OPNET, may assess detection performance in shared and non-shared network scenario examples in FIGS. 17 and 18. LTE and WiFi wireless system models available in OPNET may emulate a wireless stack, e.g., air-interface, transport, medium access control and physical layers. Source and destination, denoted by hyphenated blocks in FIGS. 17 and 18, may be connected by LTE and WiFi wireless interfaces that connect to the internet IP cloud through routers. Source and destination may be modeled, for example, as two devices, each connected to a wireless interface, to simulate source and destination devices having LTE and WiFi interfaces.

In an example, a source may be assumed to comprise two devices STA_1 connected to WiFi AP-1 and UE_1 connected to LTE eNodeB-1. Several devices may be connected to WiFi AP-1, AP-2 and LTE eNodeB-1, eNodeB-2 in contension to gain access to the wireless channel, which may create wireless access delays. Background traffic in the Internet (e.g., traffic between Client-Servers) and/or traffic between wireless devices may create congestion at routers. Router-2 may be a bottleneck in a shared router example shown in FIG. 17 while LTE and WiFi paths in a non-shared router example in FIG. 18 do not share a bottlenecked network resource. A source may send FTP traffic through both interfaces to the destination. A one way end-to-end delay may be calculated for packets received through both interfaces at the destination. A calculation may be at a TCP segment level. Background traffic in the simulation may comprise TCP and UDP flows having a mixture of traffic with exponential inter-request time, file sizes and constant bit rate applications. Performance of one or more detection algorithms may be assessed, for example, using a receiver operating characteristic (ROC) metric. Simulated flows may be analyzed every T=1 sec. A hysteresis timer may be set to $\hat{T}$=3 sec.

FIG. 19 is a plot of an example of receiver operating characteristic for shared and non-shared congested router detection. FIG. 19 shows a plot of probability of false alarm when non-shared router scenario is falsely detected as shared, and probability of detection when a shared router scenario is correctly detected as shared when the thresholds $\tau_1$, $\tau_2$ are varied. The plot in FIG. 19 shows the probability of detection is approximately 0.8 and 0.94 for false alarm rates of 0.1 and 0.2, respectively.

Performance of an example of a detection algorithm is compared with performance of a passive version of the Rubenstein's algorithm using data packets instead of probe packets. Rubenstein's algorithm results in a single operating point because it does not depend on a threshold. Performance of an example of a detection algorithm is compared with performance of a cross correlation technique where the cross correlation coefficient between the end-to-end delay experienced by packets received through the two interfaces are compared with a threshold. For different values of the threshold varied from 0 through 1, a shared congested router may be declared when the cross correlation coefficient is greater than the threshold. This technique looks at the similarity of end-to-end delay profiles of packets obtained through different interfaces and provides all possible operating points on the ROC as the threshold is varied. FIG. 19 shows that an example detection algorithm performs better than the Rubenstein's algorithm and the cross correlation technique. Improved performance may be attributed, for example, to obtaining a better estimate of the queuing delay variation from the noisy end-to-end delay observations comprising wireless access delay and link delay using techniques described herein.

WebRTC may be modified to make it compatible and more efficient for multi-path operation. Modifications may be, for example, to congestion control, scheduling efficiency and architectural recommendations during interface changes.

Single path RTP implementation of WebRTC may perform delay based congestion control at a receiver on a per frame basis. The algorithm may wait for all packets of a frame to arrive before estimating delay, which may be incompatible with MPRTP where packets of a frame may be transmitted through multiple paths with multiple subflows that may receive packets of a frame.

Figure 20:
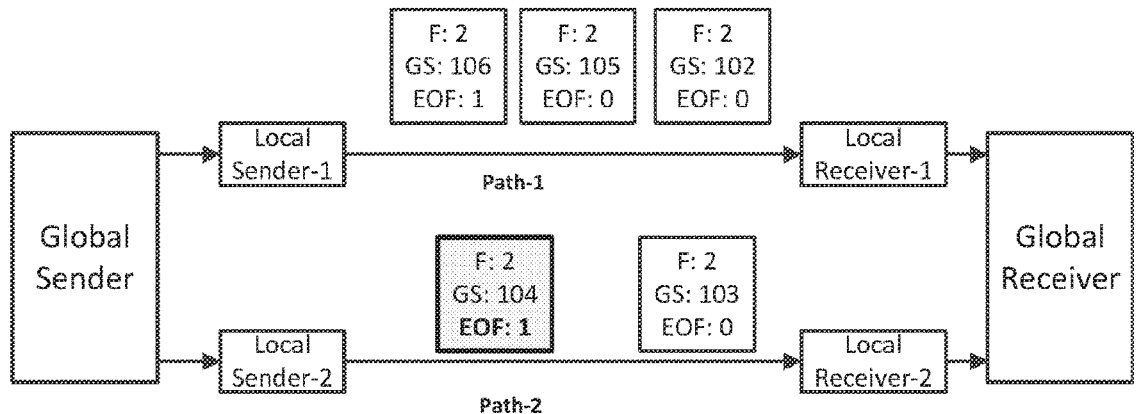
FIG. 20 is an example of additional end of frame (EOF) marker bit(s) on one or more paths for congestion control.

FIG. 20 is an example of additional end of frame (EOF) marker bit(s) on one or more paths, for example, for congestion control. FIG. 20 shows an example of a two sub-flow scenario. F denotes the frame number, GS denotes the global sequence number, and EOF denotes the end-of-frame. A global receiver may reconcile an EOF, for example, using a GS number.

In single path WebRTC, path-1 may exist and the end of frame (EOF) may be enabled on the last packet of the frame (e.g., packet with GS: 106). In multi-path WebRTC, frame number: 2 may be transmitted through multiple paths (e.g., path-1 and path-2). Packets with GS: 102, 105, 106 are transmitted through path-1 while packets with GS: 103 and 104 are transmitted through path-2. Frame based congestion control may be enabled on both paths, for example, where the local receivers may perform congestion control (e.g., delay based congestion control) based on the EOF bit.

A global sender may know a highest global sequence number belonging to a frame sent through path-1 and path-2. A global sender may set the EOF bit on the highest global sequence number that may be sent through both paths and may deliver the packets to local senders. As an example, global sender sets the EOF bits on two packets, e.g., packet with GS:106 that may be sent on path-1 and packet with GS:104 that may be sent on path-2.

Packets may be received by local receivers of both paths and provided to the global receiver. A global receiver may encounter two packets with EOF bits set. A global receiver may infer the actual end-of-frame that may be used for the play-out process. A global receiver may consider the packet with the highest global sequence number as the actual EOF. In an example, though packets with GS:104 and GS:106 have EOF bits set, the global receiver may infer the actual EOF to be the packet with GS:106, for example, because global sequence number 106 is higher than 104.

Scheduling efficiency may maximize the total throughput for a multi-path protocol. A scheduling algorithm may transmit packets in each path, for example, to equalize the difference in play out delays and an end-to-end delay.

A number of RTP packets sent on path i (i=1, 2 ... k) may be designated $n_i$. A capacity of path i (e.g., number of packets received per second in path i) may be designated $C_i$. A one way end-to-end delay of path i may be designated $D_i$. A play out delay (e.g., a difference between the target display time and time when a frame is generated) may be designated d. An RTP packet size may be designated L. The total throughput of all paths may be given by $$\frac{1}{T}\sum_{i=1}^{k} n_i,$$

where T is the inter-frame time interval. An optimization problem may be given by max $$\frac{1}{T}\sum_{i=1}^{k} n_i \text{ subject to } D_i + \frac{L}{C_i}n_i < d,$$

i=1, 2 ... k. A solution may be formulated in accordance with Eq. 6.

$$n_i = \left\lfloor \frac{(d - D_i)C_i}{L} \right\rfloor, \quad i = 1, 2 \ldots k \qquad \text{Eq. 6}$$

The number of packets transmitted through path i may, for example, depend on the difference between the playout delay bound and the end-to-end delay of the $i^{th}$ path. A play out delay bound may be the same for some or all RIP packets of a frame irrespective of the path that it is transmitted through. A solution may attempt to pack as many packets as possible in the $i^{th}$ path, which may depend on the capacity of $i^{th}$ path, for example, by taking into account the end-to-end delay of a path.

The number of available interfaces through which multi-path communication may occur may change dynamically, for example, due to fluctuating channel conditions in one or more paths, e.g., WiFi and/or LTE. Interface changes, such as during retransmissions where several receiver statistics may be tracked for RTCP reporting, may be handled, for example, in an implementation architecture.

Figure 21:
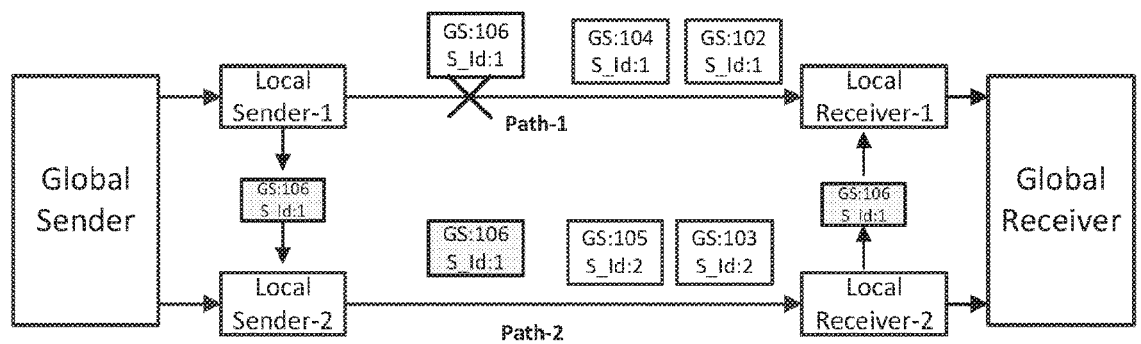
FIG. 21 is an example of handling packets during interface changes.

FIG. 21 is an example of handling packets during interface changes. FIG. 21 depicts a two-subflow scenario. GS denotes the global sequence number, while S_Id denotes the sub flow id. Packets transmitted through a sub-flow may be provided a unique S_Id. As an example, packets transmitted through path-1 may have S_Id:1 while packets transmitted through path-2 have S_Id:2.

An implementation architecture, e.g., for handling interface changes, may allow packets having different S_Id (e.g., S_Id other than the one intended for that path) to be transmitted and received through a path, for example, due to interface changes and/or weak channel conditions.

In an example situation depicted in FIG. 21, there may be two paths (path-1 and path-2) between the sender and receiver. Packets with GS: 102, 104, 106 having may be transmitted through path-1, while packets with GS: 103, 105 having 2 may be transmitted through path-2. A packet with GS:106 may be lost (in path-1). A NACK may be received by Local Sender-1 for packet with GS:106. Path-1 may go down due to weak channel conditions or due to other reasons. Local receiver-1 may have GS:106 in its NACK list and may be expecting re-transmission of this packet. As path-1 does not exist anymore, the packet with GS:106, may be sent to local sender-2, for example, when path-1 does not exist, to transmit the packet as is (e.g., without changing S_Id to 2) in path-2. Local receiver-2 may receive packet with GS:106 and S_Id:1 and may infer that this packet was not meant for its interface (e.g., by reading its S_Id). Receiver-2 may forward packet with GS:106 and S_Id:1 to local receiver-1, which may be in a position to update its NACK list. Local receiver-2 may not count packets with S_Id:1 for RTCP statistic calculation, for example, because such packets may not be meant for its interface.

An implementation architecture may be useful to maintain packet structure across interfaces, for example, when an interface frequently alternates between active and inactive due to rapid channel/link fluctuations.

A virtual multi-path protocol may enable a client to send packets through multiple interfaces. A client using a virtual multi-path protocol may not be provided with multiple interfaces and/or may not have direct access to multiple interfaces.

Figure 22:
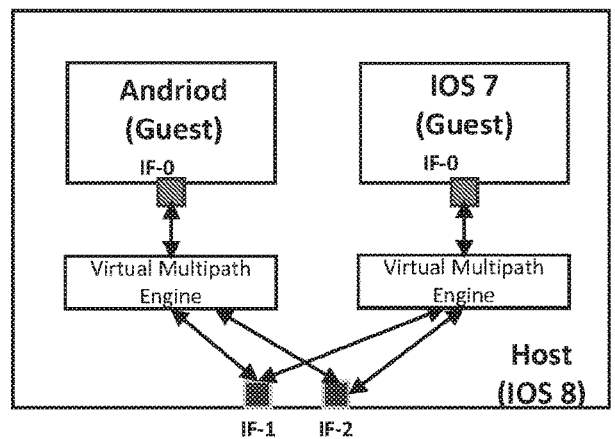
FIG. 22 is a diagram of an example of a virtual multi-path system.

FIG. 22 is a diagram of an example of a virtual multi-path system. In an example, a host may have two interfaces (e.g., IF-1, IF-2) and may run IOS-8. One guest (virtual) machine may run Andriod with one interface (IF-0) while another guest (virtual) machine may run IOS7 with one interface.

A virtual multi-path protocol may provide guest machines with the benefits of a multi-path protocol (e.g., higher bandwidth, fault tolerance etc.) while using one interface (e.g., IF-0).

In an example scenario two users may desire to initiate a face-chat application that runs on IOS operating system. A user (e.g., user-A) may have a phone that has an IOS operating system with two physical interfaces (e.g., LTE and WiFi). Another user (e.g., user-B) may have a phone endowed with two physical interfaces that may run an Android operating system as a host, and a guest machine with one interface running an IOS operating system. User-B may use the guest machine with IOS to run the face-time application. A multi-path protocol may be enabled on the guest machine with one virtual interface. A virtual multi-path protocol in the guest IOS machine may provide a better Quality of Experience for the face-time application.

A virtual multi-path engine, for example as depicted in FIG. 22, may perform packet mapping between a guest interface (e.g., IF-0) and physical interfaces e.g., (IF-1, and IF-2). A virtual multi-path engine may, for example, accept packets from a guest machine through one interface, separate packets into two streams and transmit each stream through a separate interface according to a multi-path standards specification. A procedure may involve separating a single stream into two or more streams and may involve re-numbering sequence numbers of packets, for example, based on the actual physical interface, packets would be provided to. As an example, in the case of MPRTP, the separated streams meant for two (or multiple) physical interfaces may follow the MPRTP standard specifications. The virtual multi-path engine would be responsible for making the multi-path RTP stream standard compliant.

A virtual multi-path engine, for example as depicted in FIG. 22, may multiplex packets received from physical interfaces (e.g., IF-1, and IF-2) of a host and may provide multiplexed packets to a guest interface IF-0. Data and control packets may be obtained by the host through multiple (e.g., two) physical interfaces (e.g., IF-1, and IF-2) that may have interface dependent sequence numbers, and the virtual multi-path engine maps these packets into a single RTP stream and provides it to the guest interface, IF-0.

Figure 23A:
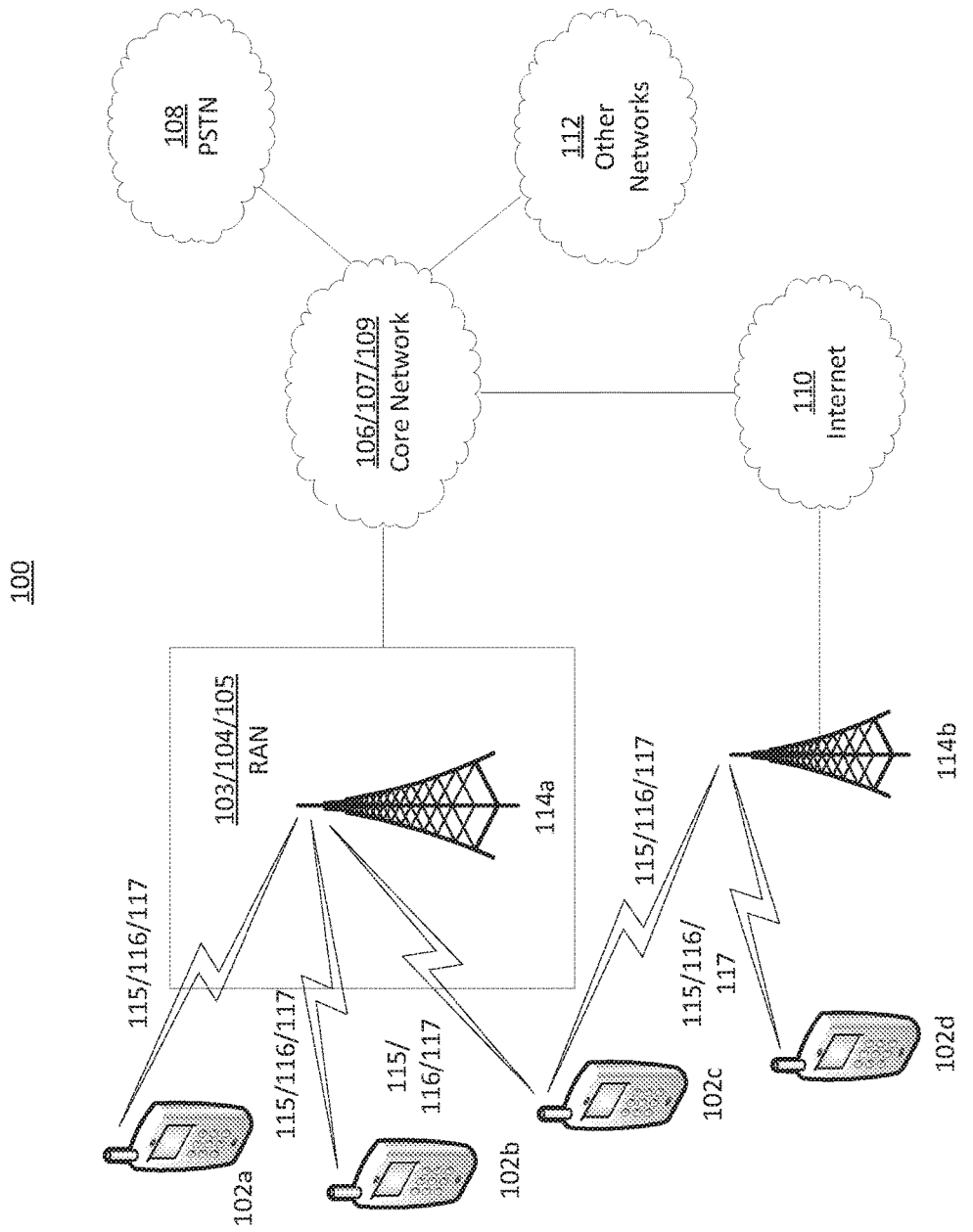
FIG. 23A is a system diagram of an example communications system in with one or more disclosed embodiments may be implemented.

FIG. 23A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 23A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors.

Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution EDGE), GSM EDGE (GERAN), and the like.

The base station 114b in FIG. 23A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology, such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 23A, the base station 114b may have a direct connection to the Internet 110. Thus, the base station 114b may not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 23A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102h, 102c, 102d in the communications system 100 may include multi-mode capabilities, e.g., the WTRUs 102a, 10213, 102c, 102d may include multiple transceivers for communicating with different wireless networks over different wireless links. For example, the WTRU 102c shown in FIG. 23A may be configured to communicate with the base station 114a, which may employ a cellular-based radio technology, and with the base station 114b, which may employ an IEEE 802 radio technology.

Figure 23B:
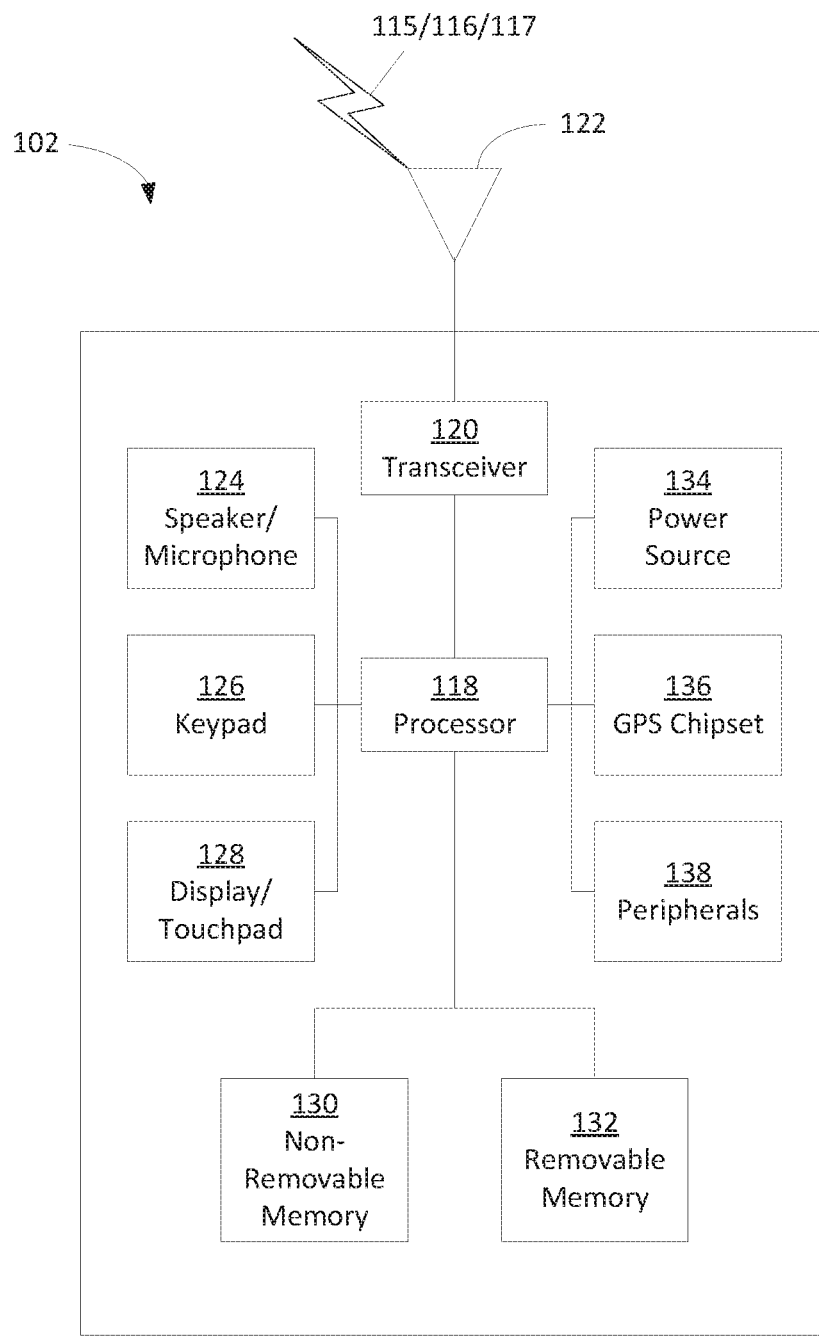
FIG. 23B is a system diagram of an example wireless transmit/receive unit (WTRU) that may be used within the communications system illustrated in FIG. 23A.

FIG. 23B is a system diagram of an example WTRU 102. As shown in FIG. 23B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 23B.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 23B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 23B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 23C:
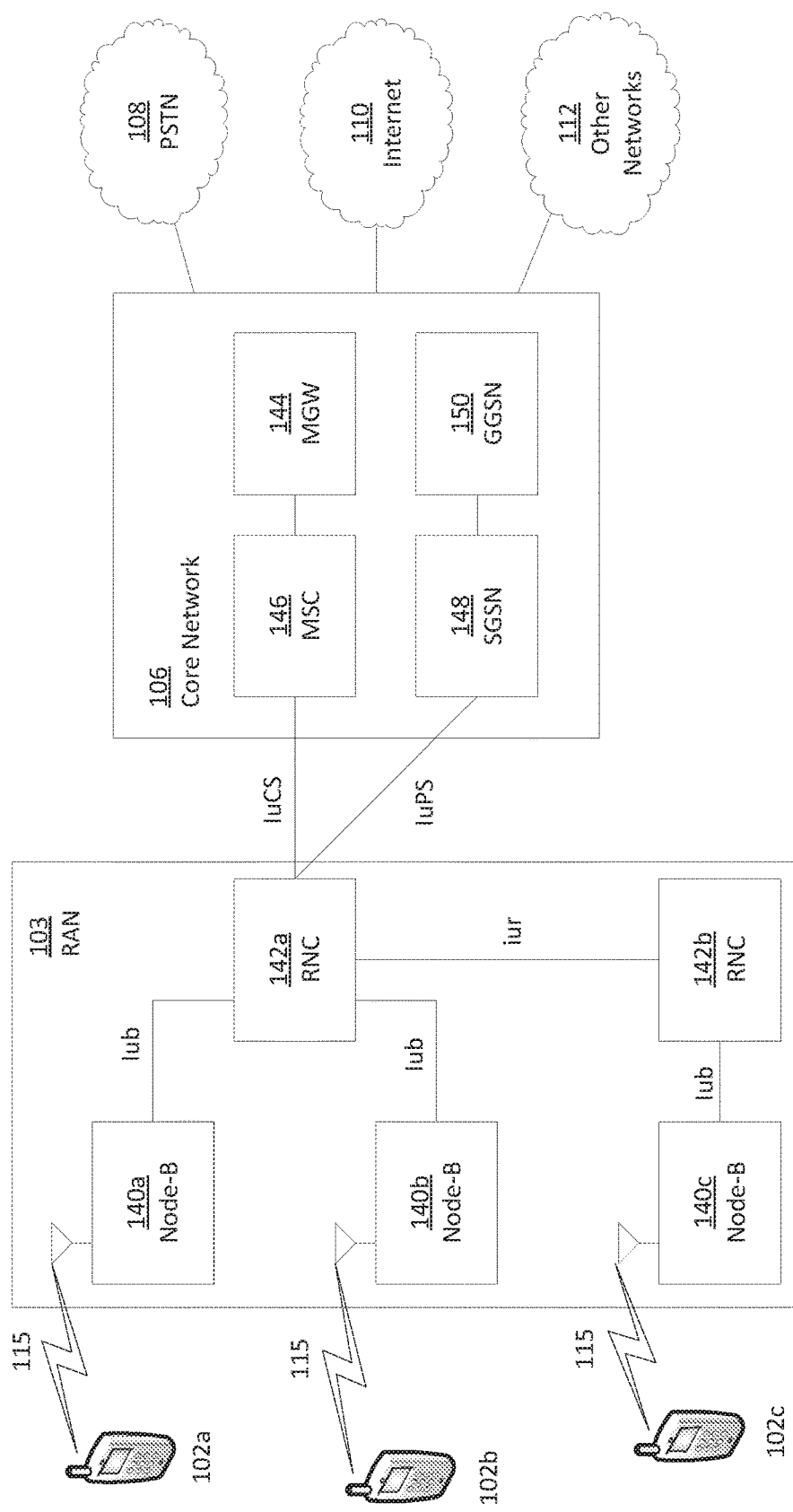
FIG. 23C is a system diagram of an example radio access network and an example core network that may be used within the communications system illustrated in FIG. 23A.

FIG. 23C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 23C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 23C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142h may be configured to carry out or support other functionality, such as outer loop power control, load control, admission control, packet scheduling, handover control, macrodiversity, security functions, data encryption, and the like.

The core network 106 shown in FIG. 23C may include a media gateway (MG-W) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface.

The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 23D:
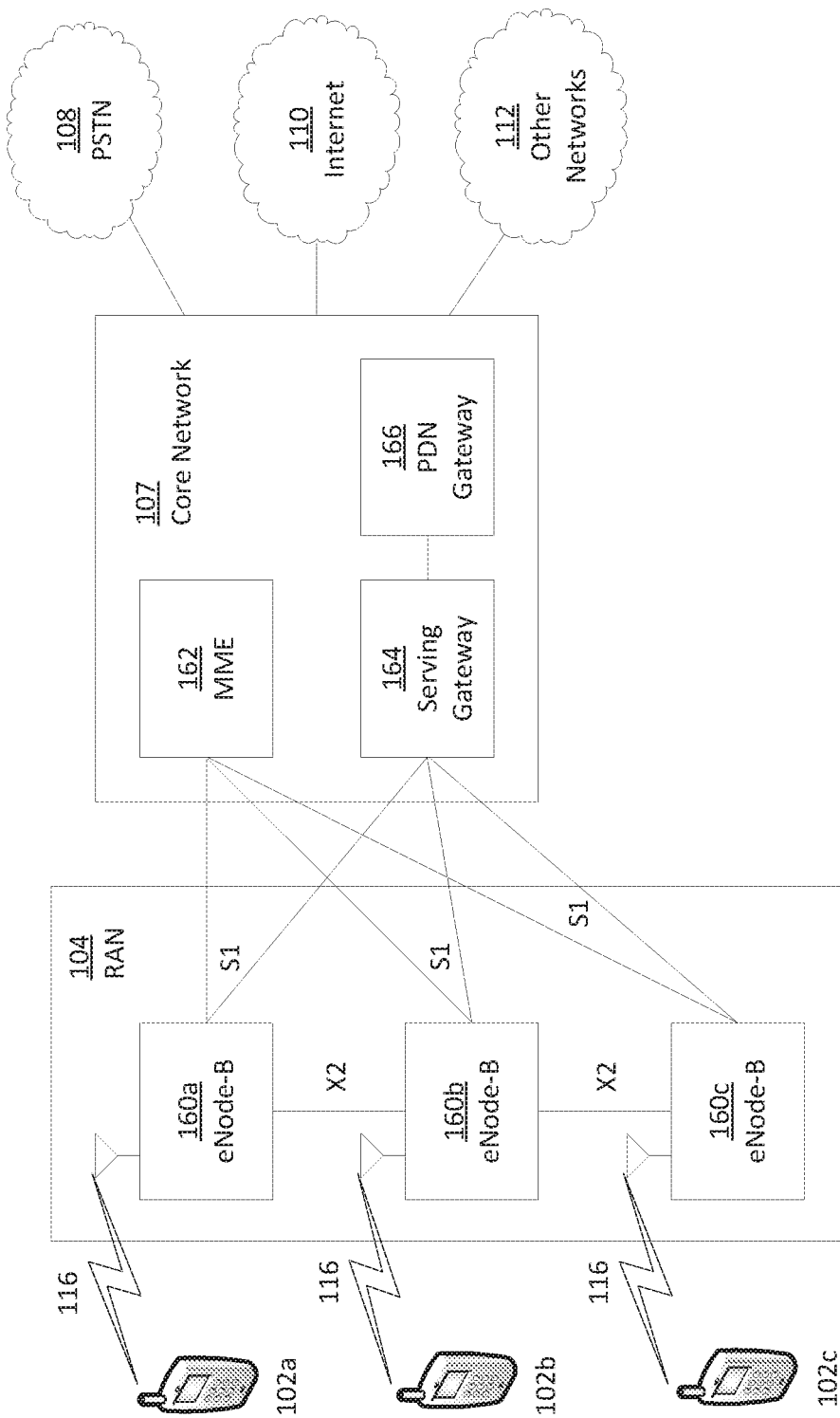
FIG. 23D is a system diagram of another example radio access network and an example core network that may be used within the communications system illustrated in FIG. 23A.

FIG. 23D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 23D, the eNode-Bs 160a, 160h, 160c may communicate with one another over an X2 interface.

The core network 107 shown in FIG. 23D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and TP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102h, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 23E:
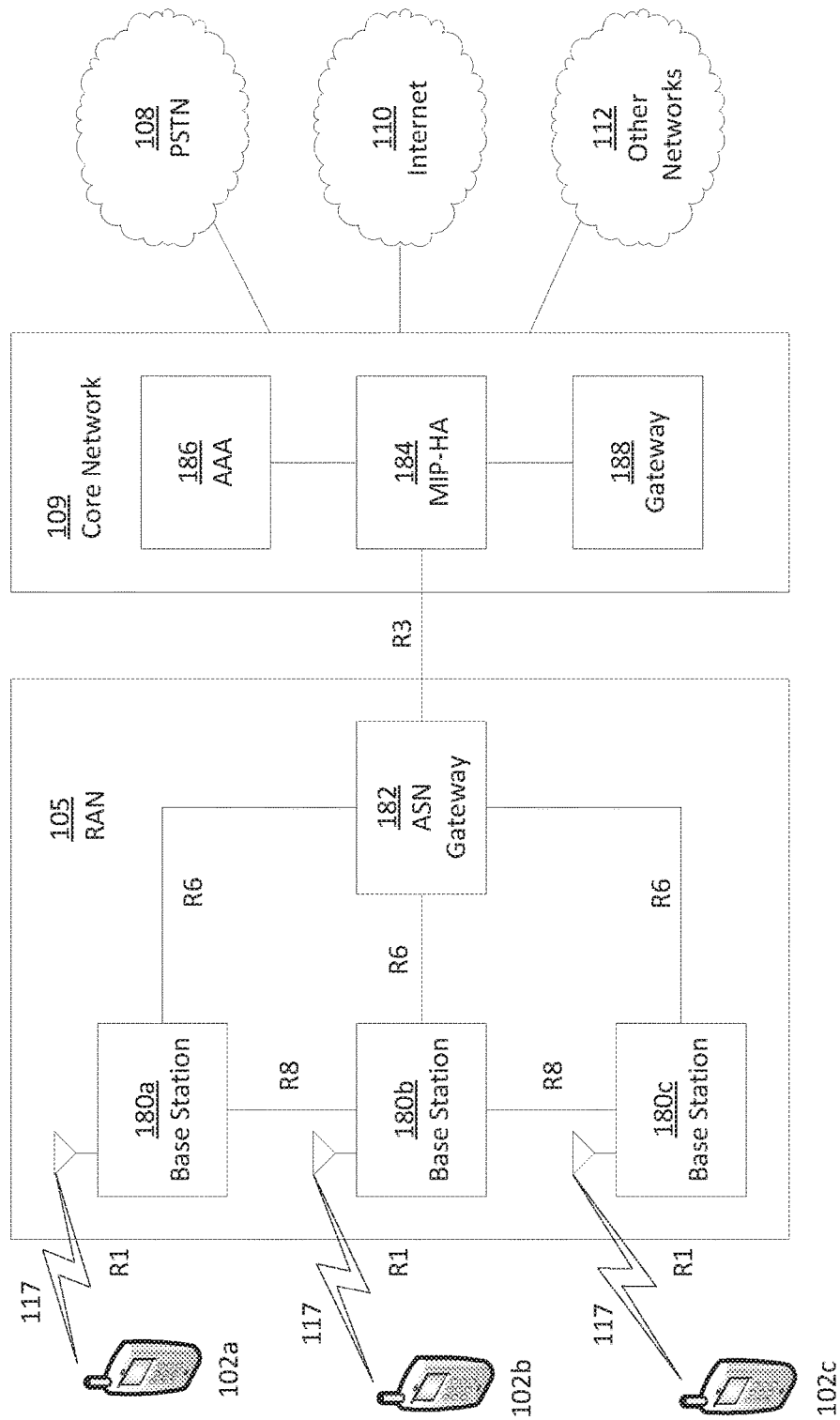
FIG. 23E is a system diagram of another example radio access network and an example core network that may be used within the communications system illustrated in FIG. 23A.

FIG. 23E is a system diagram of the RAN 105 and the core network 109 according to an embodiment. The RAN 105 may be an access service network (ASN) that employs WEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 23E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180h, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102h, 102c.

As shown in FIG. 23E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent NIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MW-HA may be responsible for IP address management, and may enable the \VIRUS 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 23E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities have been disclosed for enhancing performance of multi-path communications. Multi-path communication performance may be enhanced by determining whether multipath communications share a congested router. A multi-path real-time communication protocol may provide techniques to detect, communicate and respond to a shared congested router. A shared congested router may be detected using one or more detection techniques. In an example of a software defined network (SDN) technique, flow association of a multi-path protocol may be signaled, for example, to a SDN controller. A SDN controller may utilize flow association information, for example, to detect and/or prevent a shared congested router. In an example of an end to end technique, a receiver of a communication may observe an end-to-end delay of packets experienced by sub-flows of a multipath protocol. A receiver may detect the presence or absence of a shared congested router, for example, based on one or more algorithms. A result of the detection may be provided in (e.g., piggybacked on) an RTCP report. A sender of a communication may receive and respond with appropriate action to information in an RTCP report. One or more techniques may permit one or more algorithms to be realized in multi-path TCP and RTP protocols. WebRTC, a single path real time protocol, may be modified for compatibility with and improved efficiency in multi-path operation, for example, with respect to congestion control, scheduling efficiency and/or architectural recommendations during interface changes. Virtual multi-path protocols may be realized using one or more architectures.

Although features and elements are described above in particular combinations, one of ordinary skill in the art will appreciate that each feature or element may be used alone or in any combination with the other features and elements. In addition, techniques described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A controller for a multi-path mobile communication flow, the controller comprising:
   a processor configured to:
     receive Internet Protocol (IP) flow association information, wherein the IP flow association information indicates a first sub-flow associated with a first Radio Access Technology (RAT) of the multi-path mobile communication flow, and a second sub-flow associated with a second RAT of the multi-path mobile communication flow;
     determine if the first sub-flow and the second sub-flow share a router;
     modify a routing table for the multi-path mobile communication flow so that the first sub-flow uses a different router than the second sub-flow based on the first sub-flow and the second sub-flow sharing the router; and
     send the modified routing table to at least one router upstream from the routers.

2. The controller of claim 1, wherein the IP flow association includes at least one of a source IP address, a source port number, a destination IP address, a destination port number, and a protocol number.

3. The controller of claim 1, wherein the IP flow association is an IP-5 tuple.

4. The controller of claim 1, wherein processor is configured to receive information about a router's current state.

5. The controller of claim 4, wherein the router's current state is congested or not congested.

6. The controller of claim 1, wherein processor is configured to determine if the first sub-flow and the second sub-flow share a router by determining a queuing delay variation between packets obtained through the first sub-flow and packets obtained through the second sub-flow.

7. A method for a multi-path mobile communication flow, the method comprising:
   receiving Internet Protocol (IP) flow association information, wherein the IP flow association information indicates a first sub-flow associated with a first Radio Access Technology (RAT) of the multi-path mobile communication flow, and a second sub-flow associated with a second RAT of the multi-path mobile communication flow;
   determining if the first sub-flow and the second sub-flow share a router;

modifying a routing table for the multi-path mobile communication flow so that the first sub-flow uses a different router than the second sub-flow based on the first sub-flow and the second sub-flow sharing the router; and sending the modified routing table to at least one router upstream from the routers.

8. The method of claim 7, wherein the IP flow association includes at least one of a source IP address, a source port number, a destination IP address, a destination port number, and a protocol number.

9. The method of claim 7, wherein the IP flow association is an IP-5 tuple.

10. The method of claim 7, further comprising receiving information about a router's current state.

11. The method of claim 10, wherein the router's current state is congested or not congested.

12. The method of claim 7, wherein determining if the first sub-flow and the second sub-flow share a router includes determining a queuing delay variation between packets obtained through the first sub-flow and packets obtained through the second sub-flow.

13. A controller for a multi-path mobile communication flow, the controller comprising:
a processor configured to:
receive Internet Protocol (IP) flow association information, wherein the IP flow association information indicates a first sub-flow associated with a first Radio Access Technology (RAT) of the multi-path mobile communication flow, and a second sub-flow associated with a second RAT of the multi-path mobile communication flow;
determine if the first sub-flow and the second sub-flow share a router; and
cause an information bit to be set in a reverse flow associated with the multi-path mobile communication flow based on the first sub-flow and the second sub-flow sharing the router.

14. The controller of claim 13, wherein the processor is configured to create a rule for at least one router of the multi-path mobile communication flow so that an information bit is set in at least one sub-flow.

15. The controller of claim 14, wherein the information bit is set in an IP options field of a data packet.

16. The controller of claim 14, wherein the information bit is set in an extension section of a Real-time Transport Control Protocol (RTCP) report.

17. The controller of claim 14, wherein the information bit is set in an options field of a transmission control protocol (TCP) header.

18. The controller of claim 13, wherein the information bit is caused to be set in the reverse flow.

19. The controller of claim 13, wherein processor is configured to determine if the first sub-flow and the second sub-flow share a router by determining a queuing delay variation between packets obtained through the first sub-flow and packets obtained through the second sub-flow.

20. A method for a multi-path mobile communication flow, the method comprising:

receiving Internet Protocol (IP) flow association information, wherein the IP flow association information indicates a first sub-flow associated with a first Radio Access Technology (RAT) of the multi-path mobile communication flow, and a second sub-flow associated with a second RAT of the multi-path mobile communication flow;
determining if the first sub-flow and the second sub-flow share a router; and
causing an information bit to be set in a reverse flow associated with the multi-path mobile communication flow based on the first sub-flow and the second sub-flow sharing the router.

21. The method of claim 20, further comprising creating a rule for at least one router of the multi-path mobile communication flow so that an information bit is set in at least one sub-flow.

22. The method of claim 21, wherein the information bit is set in an IP options field of a data packet.

23. The method of claim 21, wherein the information bit is set in an extension section of a Real-time Transport Control Protocol (RTCP) report.

24. The method of claim 21, wherein the information bit is set in an options field of a transmission control protocol (TCP) header.

25. The method of claim 20, wherein the information bit is caused to be set in the reverse flow.

26. The method of claim 20, wherein determining if the first sub-flow and the second sub-flow share a router includes determining a queuing delay variation between packets obtained through the first sub-flow and packets obtained through the second sub-flow.

27. A method for detecting a shared congested router in a multi-path mobile communication flow, the method comprising:
detecting a queuing delay for a first sub-flow associated with a first Radio Access Technology (RAT) of the multi-path mobile communication flow;
detecting a queuing delay for a second sub-flow associated with a second RAT of the multi-path mobile communication flow;
determining a queuing delay variation between the first sub-flow and the second sub-flow; and
using the queuing delay variation, inferring the presence or absence of a shared congested router in a multi-path mobile communication flow.

28. The method of claim 27, wherein the queuing delay variation is a time aligned queuing delay variation.

29. The method of claim 27, further comprising using the end-to-end delay of a packet to determine queuing delay variation of the first sub-flow or the second sub-flow.

30. The method of claim 27, wherein a receiver of the first sub-flow and the second sub-flow performs the detection of a queuing delay variation.

31. The method of claim 27, wherein the receiver notifies a sender about the presence or absence of a shared congested router.

* * * * *